US012571872B2

(12) United States Patent
Gulati et al.

(10) Patent No.: US 12,571,872 B2
(45) Date of Patent: Mar. 10, 2026

(54) SIDELINK-ASSISTED POSITIONING

(71) Applicant: QUALCOMM Incorporated, San Diego, CA (US)

(72) Inventors: Kapil Gulati, Belle Mead, NJ (US); Sudhir Kumar Baghel, Pleasanton, CA (US); Hong Cheng, Basking Ridge, NJ (US); Chang-Sik Choi, Seoul (KR); Alexandros Manolakos, Escondido, CA (US); Shuanshuan Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 546 days.

(21) Appl. No.: 17/995,062

(22) PCT Filed: Mar. 16, 2021

(86) PCT No.: PCT/US2021/022599
§ 371 (c)(1),
(2) Date: Sep. 29, 2022

(87) PCT Pub. No.: WO2021/225696
PCT Pub. Date: Nov. 11, 2021

(65) Prior Publication Data
US 2023/0125710 A1 Apr. 27, 2023

(30) Foreign Application Priority Data

May 4, 2020 (GR) .............................. 20200100223

(51) Int. Cl.
*G01S 5/02* (2010.01)
*H04W 64/00* (2009.01)

(52) U.S. Cl.
CPC ......... *G01S 5/0236* (2013.01); *H04W 64/006* (2013.01)

(58) Field of Classification Search
CPC ......... H04W 4/40; H04W 4/029; H04W 4/46; H04W 4/02; H04W 4/80; H04W 4/38;
(Continued)

(56) References Cited

U.S. PATENT DOCUMENTS 8,364,172 B2 * 1/2013 Guanfeng ............. H04W 4/023
455/456.2
8,792,902 B2 7/2014 Edge et al.
(Continued)

FOREIGN PATENT DOCUMENTS

CN 103039108 A 4/2013
CN 110383862 A 10/2019
(Continued)

OTHER PUBLICATIONS

"3rd Generation Partnership Project, Technical Specification Group Radio Access Network, Study on Indoor Positioning Enhancements for UTRA and LTE (Release 13)", 3GPP Draft, TR37.857, V13.1.0, DRAFT37857-D10, 3rd Generation Partnership Project (3GPP), Mobile Competence Centre, 650, Route Des Lucioles, F-06921 Sophia-Antipolis Cedex, France, Dec. 15, 2015 (Dec. 15, 2015), XP051063636, pp. 1-82, section 7.1.1.1.3; p. 40 section 7.1.1.2.3; p. 54.
(Continued)

*Primary Examiner* — Kwasi Karikari
(74) *Attorney, Agent, or Firm* — Harrity & Harrity, LLP/ QUALCOMM Incorporated

(57) ABSTRACT

Various aspects of the present disclosure generally relate to wireless communication. In some aspects, a user equipment (UE) may transmit, to another UE, a positioning request associated with a procedure for determining a position of the UE, wherein the positioning request comprises a first side-link communication between a first sidelink location management component (S-LMC) of the UE and a second
(Continued)

S-LMC of the other UE, wherein the first S-LMC and the second S-LMC comprise sub-functions associated with a vehicle-to-everything protocol layer; receive, from the other UE, a second sidelink communication associated with the procedure for determining the position of the UE; and determine the position of the UE based at least in part on the second sidelink communication. Numerous other aspects are provided.

30 Claims, 10 Drawing Sheets

(58) Field of Classification Search
CPC ....... H04W 4/023; H04W 4/027; H04W 4/48; H04W 84/18; H04W 84/005; H04W 64/00; H04W 8/005; H04W 88/02; H04W 24/10; H04W 16/14; H04W 72/12; H04W 76/12; H04W 72/04; H04W 28/20; H04W 28/22; H04W 52/50; H04W 12/104; H04W 12/63; H04W 36/08; H04W 52/0229; H04W 64/003; H04W 72/25
See application file for complete search history.

(56) References Cited

U.S. PATENT DOCUMENTS

| | | | |
|---|---|---|---|
| 2013/0336224 A1 | 12/2013 | Davydov et al. | |
| 2014/0274111 A1* | 9/2014 | Edge ...................... | H04W 4/80 |
| | | | 455/456.1 |
| 2016/0095080 A1* | 3/2016 | Khoryaev ............. | G01S 5/0284 |
| | | | 455/456.1 |
| 2018/0077529 A1 | 3/2018 | Ryu et al. | |
| 2019/0230618 A1 | 7/2019 | Saur et al. | |
| 2019/0239181 A1 | 8/2019 | Gangakhedkar et al. | |
| 2020/0183002 A1* | 6/2020 | Lee ......................... | G01S 19/14 |
| 2021/0160810 A1* | 5/2021 | Zhang ...................... | G01S 5/10 |

FOREIGN PATENT DOCUMENTS

| | | |
|---|---|---|
| CN | 110536234 A | 12/2019 |
| CN | 111076731 A | 4/2020 |
| EP | 2843989 A1 | 3/2015 |
| EP | 3253140 A1 | 12/2017 |
| KR | 20160145986 A | 12/2016 |
| WO | 2007002333 | 1/2007 |
| WO | 2018068817 A1 | 4/2018 |
| WO | 2019027245 A1 | 2/2019 |
| WO | 2019240550 A1 | 12/2019 |
| WO | 2020028517 A1 | 2/2020 |
| WO | 2020030266 A1 | 2/2020 |
| WO | 2020035153 A1 | 2/2020 |
| WO | 2020067764 A1 | 4/2020 |
| WO | 2020196483 A1 | 10/2020 |
| WO | 2020231303 A1 | 11/2020 |
| WO | 2021027861 A1 | 2/2021 |
| WO | 2021045565 A1 | 3/2021 |
| WO | 2021075851 A1 | 4/2021 |

OTHER PUBLICATIONS

"ETSI EN 302 637-2 V1.4.1 (Apr. 2019) Intelligent Transport Systems (ITS); Vehicular Communications; Basic Set of Applications; Part 2: Specification of Cooperative Awareness Basic Service", IEEE Draft, ITS(18) 031042R1_INCLUSION_OF_C-V2X_ IN_EN_302_637-2, IEEE-SA, Piscataway, NJ USA, vol. 802.11 ETSI ITS, No. r1, Jun. 29, 2018 (Jun. 29, 2018), 45 pages, XP068163972, chapter 5.2.

International Search Report and Written Opinion—PCT/US2021/ 022599—ISA/EPO—Oct. 22, 2021.

Lucent A., et al., "Alignment of LCS Routing Identifiers", 3GPP Draft, 3GPP TSG SA WG2 Meeting #77, S2-101620, (WAS 1613 1399+1147) 23.271 LCS Routing IDS, 3rd Generation Partnership Project (3GPP), Mobile Competence Centre, 650, Route Des Lucioles, F-06921 Sophia-Antipolis Cedex, France, vol. SA WG2, No. San Francisco, USA, Feb. 22, 2010, Mar. 2, 2010 (Mar. 2, 2010), XP050434165, 10 Pages, [Retrieved on Mar. 2, 2010] 5.

NTT DOCOMO INC: "Modification of Network Requested CA Band Combination Retrieval for Intra-Band Non-Contiguous CA", 3GPP Draft, 3GPP TSG-RAN WG2 Meeting #93, 36331_CR2075R2_ (REL-13) R2-161811, 3rd Generation Partnership Project (3GPP), Mobile Competence Centre, 650, Route Des Lucioles, F-06921 Sophia-Antipolis Cedex, France, vol. RAN WG2. No. St. Julian's. Malta, Feb. 15, 2016-Feb. 19, 2016, Mar. 16, 2016 (Mar. 16, 2016), XP051081739, 30 Pages, p. 26.

Partial International Search Report—PCT/US2021/022599—ISA/ EPO—Jun. 21, 2021.

Qualcomm Incorporated (Moderator): "Email Summary on NR Positioning", 3GPP Draft, RP-192412, 3GPP TSG-RAN Meeting #86, 3rd Generation Partnership Project (3GPP), Mobile Competence Centre, 650, Route Des Lucioles, F-06921 Sophia-Antipolis Cedex, France, vol. TSG RAN, No. Sitges, Spain, Dec. 9, 2019- Dec. 12, 2019, Dec. 2, 2019 (Dec. 2, 2019), XP051834111, 87 Pages, the whole document.

Rola Naja: "Wireless Vehicular Networks for Car Collision Avoidance" In: "Wireless Vehicular Networks for Car Collision Avoidance", May 23, 2013 (May 23, 2013), Springer Verlag, DE, XP055386951, pp. 45-47, ISBN: 978-1-4419-9562-9, Retrieved from the Internet: URL: chapter title="Link: https://www.springer. com/de/book/9781441995629>chapter">https://www.springer.com/ de/book/9781441995629chapter 2.3.2 Point CoordinationbFunction p. 45-p. 47.

* cited by examiner

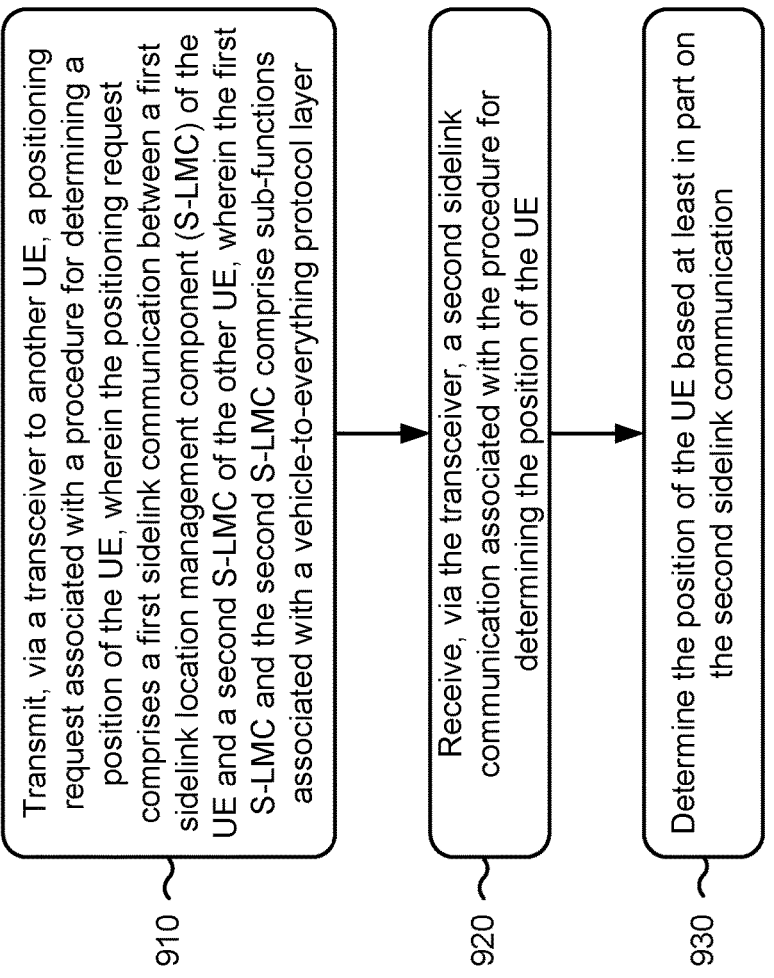

Transmit, via a transceiver to another UE, a positioning request associated with a procedure for determining a position of the UE, wherein the positioning request comprises a first sidelink communication between a first sidelink location management component (S-LMC) of the UE and a second S-LMC of the other UE, wherein the first S-LMC and the second S-LMC comprise sub-functions associated with a vehicle-to-everything protocol layer

910

Receive, via the transceiver, a second sidelink communication associated with the procedure for determining the position of the UE

920

Determine the position of the UE based at least in part on the second sidelink communication

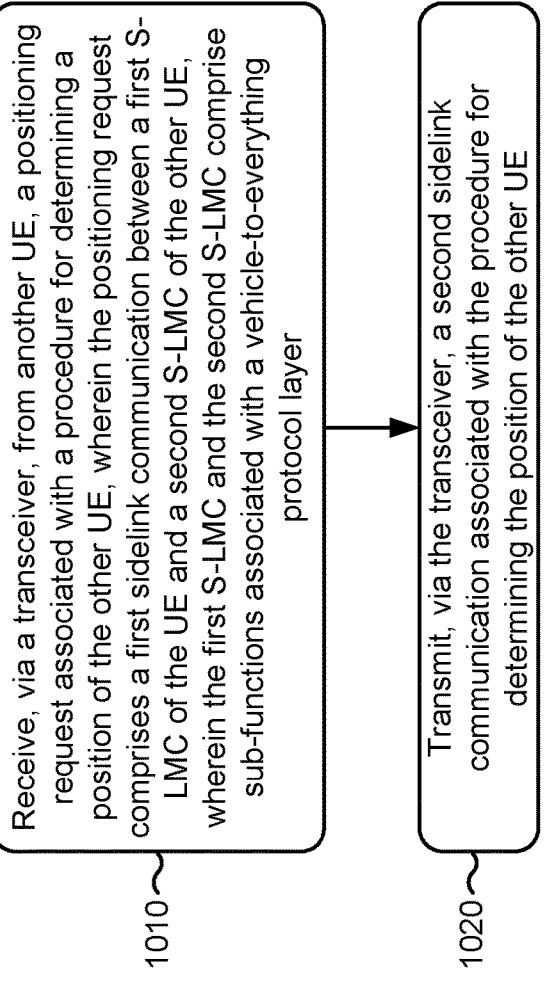

1010 Receive, via a transceiver, from another UE, a positioning request associated with a procedure for determining a position of the other UE, wherein the positioning request comprises a first sidelink communication between a first S-LMC of the UE and a second S-LMC of the other UE, wherein the first S-LMC and the second S-LMC comprise sub-functions associated with a vehicle-to-everything protocol layer 1020 Transmit, via the transceiver, a second sidelink communication associated with the procedure for determining the position of the other UE

SIDELINK-ASSISTED POSITIONING

CROSS-REFERENCE TO RELATED APPLICATIONS

This Patent Application is a 371 national stage of PCT Application No. PCT/US2021/022599 filed on Mar. 16, 2021, entitled "SIDELINK-ASSISTED POSITIONING," which claims priority to Greek Patent Application No. 20200100223, filed on May 4, 2020, entitled "SIDELINK-ASSISTED POSITIONING." POSITIONING The disclosure of the prior Applications are considered part of and are hereby expressly incorporated by reference into this Patent Application.

FIELD OF THE DISCLOSURE

Aspects of the present disclosure generally relate to wireless communication and to techniques and apparatuses for sidelink-assisted positioning.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a user equipment (UE), may include transmitting, via a transceiver to another UE, a positioning request associated with a procedure for determining a position of the UE, wherein the positioning request comprises a first sidelink communication between a first sidelink location management component (S-LMC) of the UE and a second S-LMC of the other UE, wherein the first S-LMC and the second S-LMC comprise sub-functions associated with a vehicle-to-everything protocol layer; receiving, via the transceiver from the other UE, a second sidelink communication associated with the procedure for determining the position of the UE; and determining the position of the UE based at least in part on the second sidelink communication.

In some aspects, a method of wireless communication, performed by a UE, may include receiving, via a transceiver from another UE, a positioning request associated with a procedure for determining a position of the other UE, wherein the positioning request comprises a first sidelink communication between a first S-LMC of the UE and a second S-LMC of the other UE, wherein the first S-LMC and the second S-LMC comprise sub-functions associated with a vehicle-to-everything protocol layer; and transmitting, via the transceiver to the other UE, a second sidelink communication associated with the procedure for determining the position of the other UE.

In some aspects, a UE for wireless communication may include a memory, a transceiver, and one or more processors operatively coupled to the memory. The one or more processors may be configured to transmit, via the transceiver to another UE, a positioning request associated with a procedure for determining a position of the UE, wherein the positioning request comprises a first sidelink communication between a first S-LMC of the UE and a second S-LMC of the other UE, wherein the first S-LMC and the second S-LMC comprise sub-functions associated with a vehicle-to-everything protocol layer; receive, via the transceiver from the other UE, a second sidelink communication associated with the procedure for determining the position of the UE; and determine the position of the UE based at least in part on the second sidelink communication.

In some aspects, a UE for wireless communication may include a memory, a transceiver, and one or more processors operatively coupled to the memory. The one or more processors may be configured to receive, via the transceiver from another UE, a positioning request associated with a procedure for determining a position of the other UE, wherein the positioning request comprises a first sidelink communication between a first S-LMC of the UE and a second S-LMC of the other UE, wherein the first S-LMC and the second S-LMC comprise sub-functions associated with a vehicle-to-everything protocol layer; and transmit, via the transceiver to the other UE, a second sidelink communication associated with the procedure for determining the position of the other UE.

In some aspects, a non-transitory computer-readable medium may store one or more instructions for wireless communication. The one or more instructions, when executed by one or more processors of a UE, may cause the one or more processors to transmit, via a transceiver to another UE, a positioning request associated with a procedure for determining a position of the UE, wherein the positioning request comprises a first sidelink communication between a first S-LMC of the UE and a second S-LMC of the other UE, wherein the first S-LMC and the second S-LMC comprise sub-functions associated with a vehicle-to-everything protocol layer; receive, via the transceiver from the other UE, a second sidelink communication associated with the procedure for determining the position of the UE; and determine the position of the UE based at least in part on the second sidelink communication.

In some aspects, a non-transitory computer-readable medium may store one or more instructions for wireless communication. The one or more instructions, when executed by one or more processors of a UE, may cause the one or more processors to receive, via a transceiver from another UE, a positioning request associated with a procedure for determining a position of the other UE, wherein the positioning request comprises a first sidelink communication between a first S-LMC of the UE and a second S-LMC of the other UE, wherein the first S-LMC and the second S-LMC comprise sub-functions associated with a vehicle-to-everything protocol layer; and transmit, via the transceiver to the other UE, a second sidelink communication associated with the procedure for determining the position of the other UE.

In some aspects, an apparatus for wireless communication may include means for transmitting, to another apparatus, a positioning request associated with a procedure for determining a position of the apparatus, wherein the positioning request comprises a first sidelink communication between a first S-LMC of the apparatus and a second S-LMC of the other apparatus, wherein the first S-LMC and the second S-LMC comprise sub-functions associated with a vehicle-to-everything protocol layer; means for receiving, from the other apparatus, a second sidelink communication associated with the procedure for determining the position of the apparatus; and means for determining the position of the apparatus based at least in part on the second sidelink communication.

In some aspects, an apparatus for wireless communication may include means for receiving, from another apparatus, a positioning request associated with a procedure for determining a position of the other apparatus, wherein the positioning request comprises a first sidelink communication between a first S-LMC of the apparatus and a second S-LMC of the other apparatus, wherein the first S-LMC and the second S-LMC comprise sub-functions associated with a vehicle-to-everything protocol layer; and means for transmitting, to the other apparatus, a second sidelink communication associated with the procedure for determining the position of the other apparatus.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 9 and 10 are diagrams illustrating example processes performed, for example, by a user equipment, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
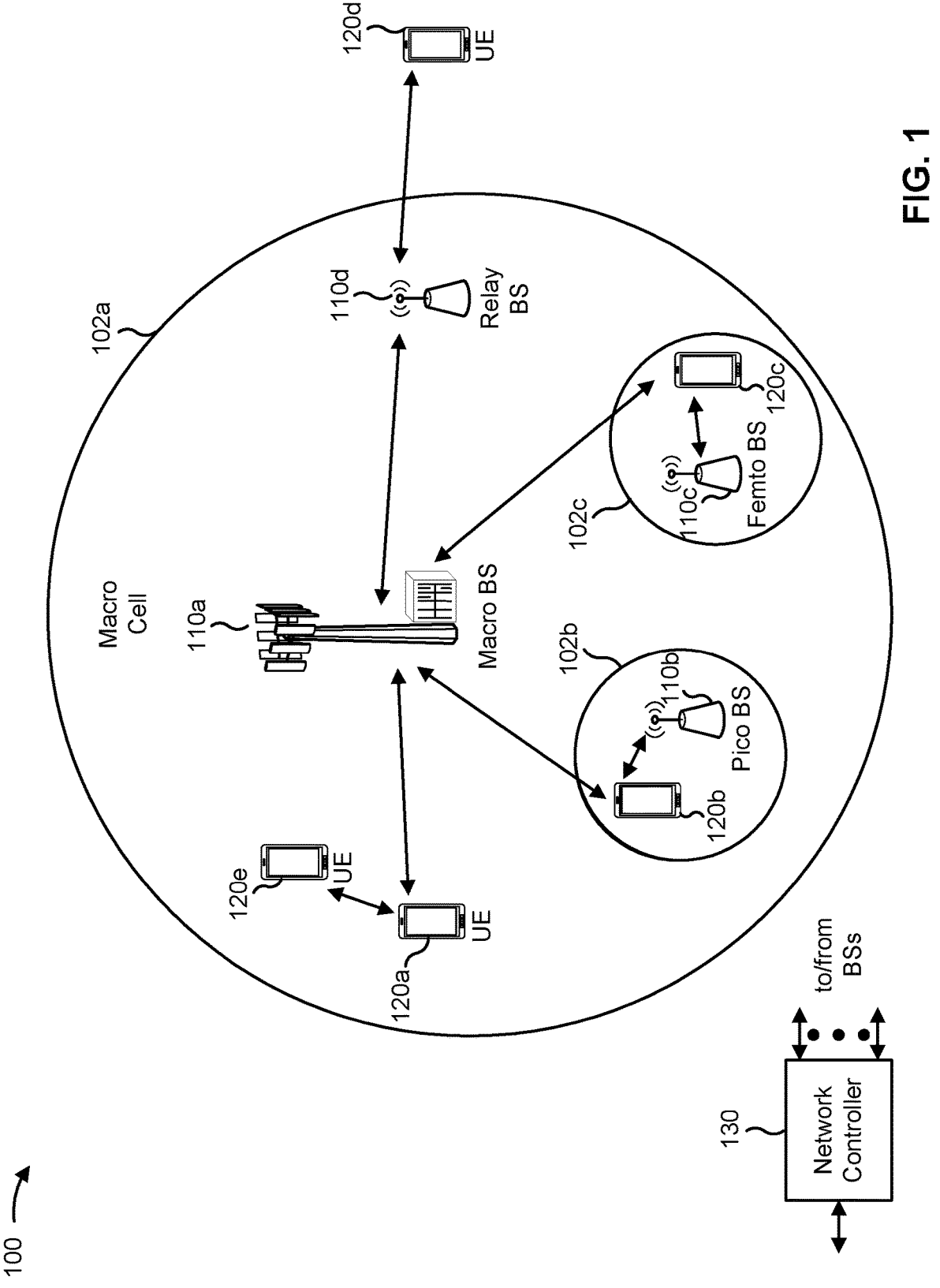
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
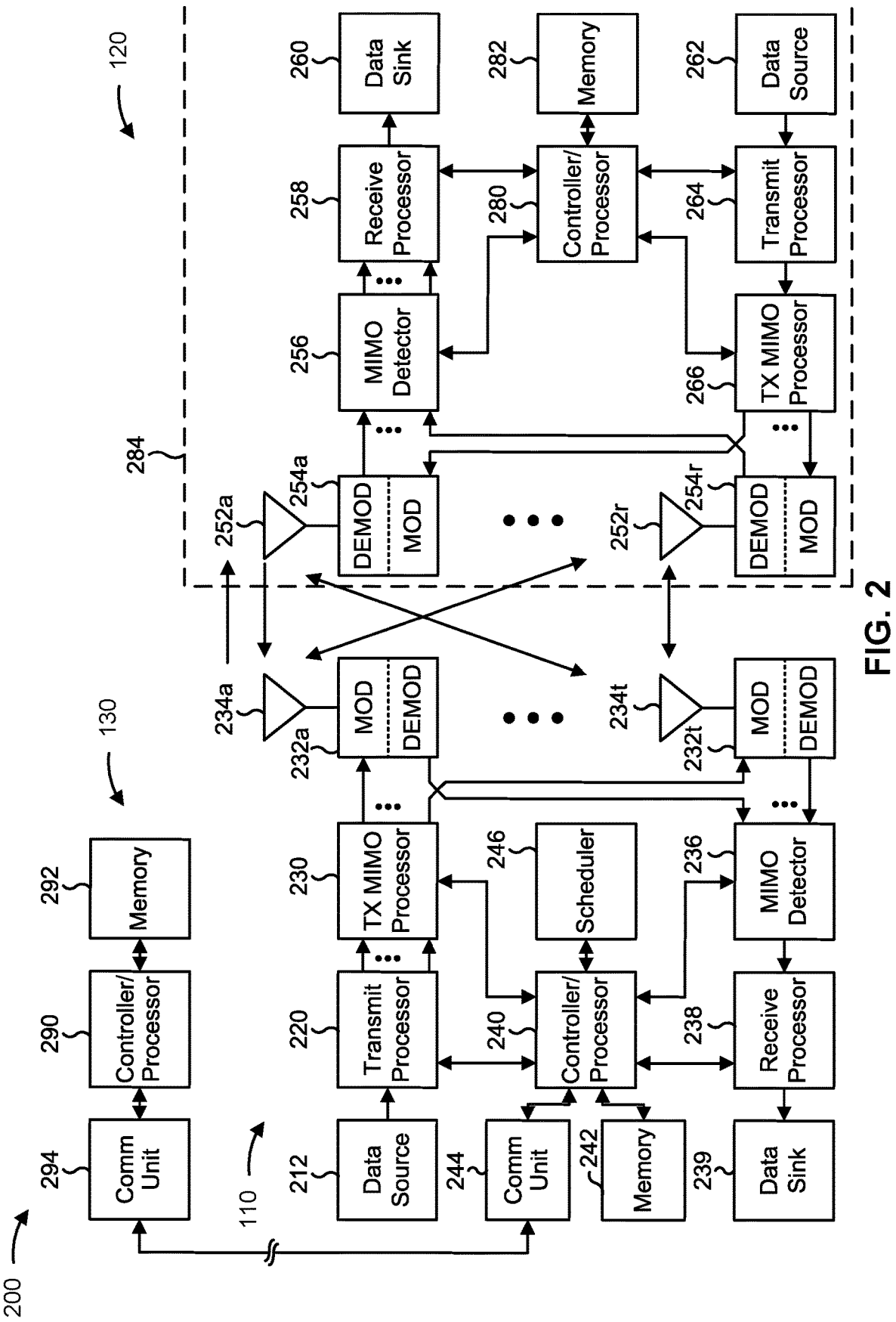
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 6-10.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 6-10.

Controller/processor 240 of base station 110, controller/processor 280 of UE 120, and/or any other component(s) of FIG. 2 may perform one or more techniques associated with sidelink-assisted positioning, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, and/or other processes as described herein. In some aspects, executing instructions may include running the instructions, converting the instructions, compiling the instructions, and/or interpreting the instructions, among other examples.

In some aspects, UE 120 may include means for transmitting, to another UE, a positioning request associated with a procedure for determining a position of the UE, wherein the positioning request comprises a first sidelink communication between a first sidelink location management component (S-LMC) of the UE and a second S-LMC of the other UE, wherein the first S-LMC and the second S-LMC comprise sub-functions associated with a vehicle-to-everything protocol layer, means for receiving, from the other UE, a second sidelink communication associated with the procedure for determining the position of the UE, means for determining the position of the UE based at least in part on the second sidelink communication, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, UE 120 may include means for receiving, from another UE, a positioning request associated with a procedure for determining a position of the other UE, wherein the positioning request comprises a first sidelink communication between a first S-LMC of the UE and a second S-LMC of the other UE, wherein the first S-LMC and the second S-LMC comprise sub-functions associated with a vehicle-to-everything protocol layer, means for transmitting, to the other UE, a second sidelink communication associated with the procedure for determining the position of the other UE, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
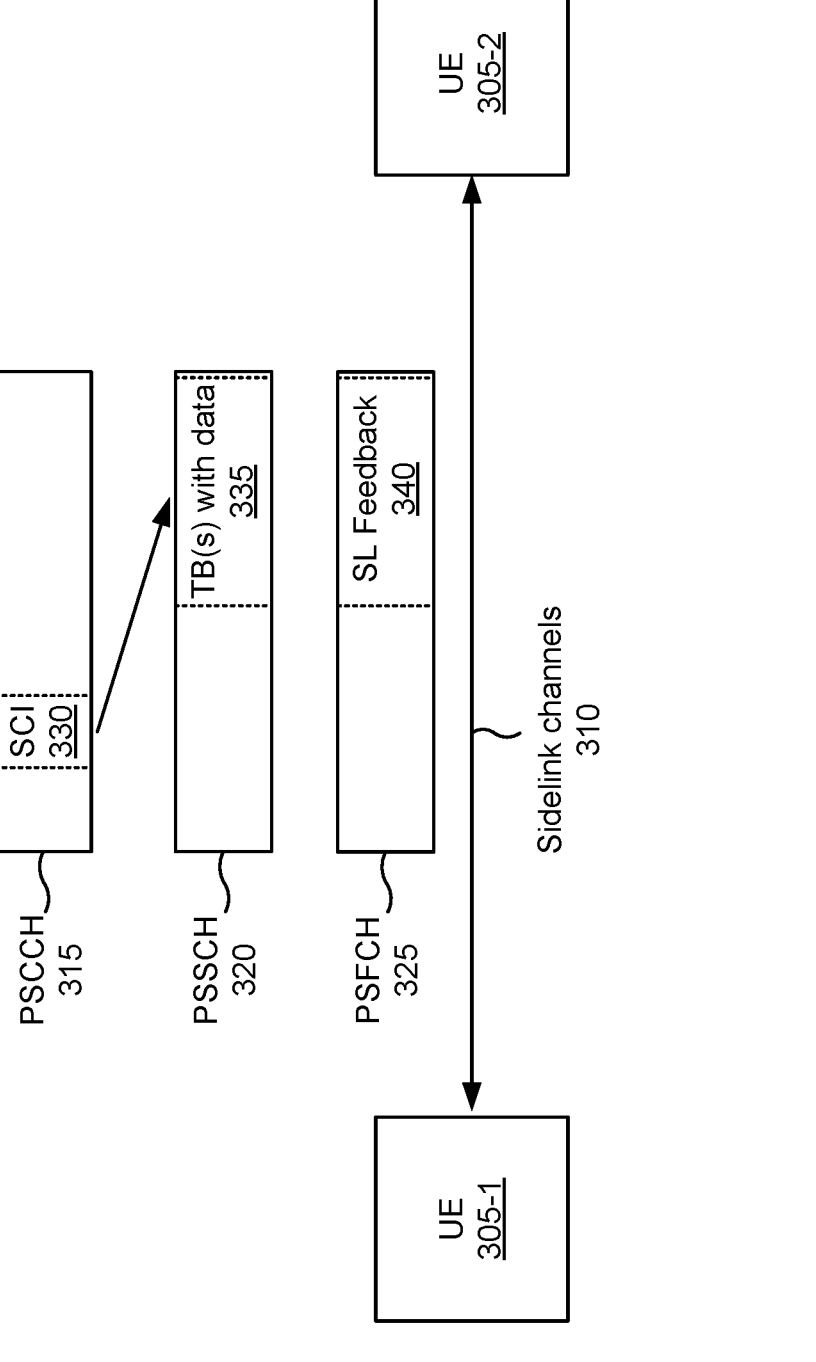
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure a RSSI parameter (e.g., a sidelink-RSSI (S-RSSI) parameter) associated with various sidelink channels, may measure an RSRP parameter (e.g., a PSSCH-RSRP parameter) associated with various sidelink channels, and/or may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or a MCS to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
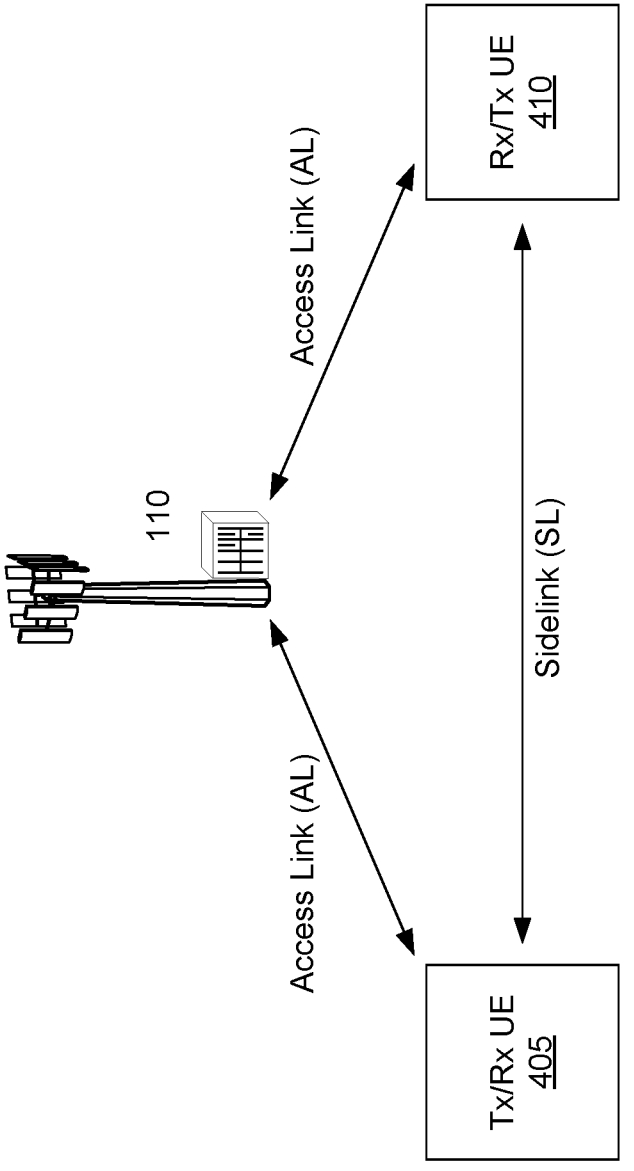
FIG. 4 is a diagram illustrating an example of sidelink communications and access link communications, in accordance with the present disclosure.
Figure 4:

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

V2X positioning may involve a UE associated with a vehicle or pedestrian positioning itself using other UEs associated with roadside units (RSUs), other vehicles, other pedestrians, and/or the like. V2X positioning may include, for example, infrastructure-to-vehicle (I2V) positioning, V2V positioning, vehicle-to-pedestrian (V2P) positioning, and/or the like.

V2X positioning methods may differ from access link (Uu)-based UE positioning methods. In Uu-based positioning, a location management function (LMF) maintained in the NR core network determines the position of the UE based on input from the UE and/or measurements obtained by the RAN (e.g., a base station, and/or the like). Uu-based positioning may be beneficial in that computation is performed in the core network, which may offer large amounts of computational power. However, a UE does not always have access to the core network. Moreover, to support Uu-based positioning, signaling overhead may be introduced between the UE, one or more base stations, the core network, and/or the like.

V2X positioning may leverage vehicle mobility and accurate information of the vehicle velocity. For example, while a particular position of a UE may be unknown to the UE, relative displacement over consecutive time instances may be known accurately, using motion sensors associated with the vehicle. Vehicle motion may enable large changes in angular positions relative to anchor devices, which are devices that are not moving, such as, for example, RSUs, and/or the like. Multiple time measurements can thus be used to improve position accuracy.

In sidelink-based positioning, a UE associated with a vehicle may solve for the UE's position using positioning reference signal (PRS)-based measurements made by the UE associated with the vehicle and/or by anchor UEs. In this way, the UE may benefit from the vehicle's knowledge of its own velocity, velocity errors, global positioning system (GPS) measurement, GPS errors, and/or the like. The UE may use this information, transmission-receive calibration errors, and/or the like to determine the UE's position based at least in part on multiple measurements in time. The UE may determine its position without relying on another entity such as an RSU, central server, and/or the like. However, the accuracy of the position determination may be limited by the single perspective from which the measurements are obtained and/or calculated.

Various aspects of techniques and apparatuses described herein may facilitate sidelink-assisted positioning. In some aspects, sidelink-assisted positioning may be performed without relying on a central entity, but may benefit from measurements based on multiple perspectives. In some aspects, a determination of a UE's position may be more accurate when it is based at least in part on positioning measurements obtained by different UEs, as each of the UEs will have a different perspective of the UE's movement relative thereto. In some aspects, a UE's position is determined using only sidelink-based measurements and computations. In some aspects, a sidelink location management component (S-LMC) is provided as a sub-function in the V2X layer of UEs. The S-LMC may support one or more functionalities that enable sidelink-assisted positioning. In some aspects, the S-LMC may support most, or all, of the functions typically provided by a network-operated LMF.

In some aspects, a UE associated with a vehicle may determine its position using RTT measurements based on communications with another UE. The other UE may be associated with another vehicle, an RSU, and/or the like. In some aspects, the UEs may transmit PRSs to one another and obtain positioning measurements associated with the UE based on the PRSs. The other UE may transmit positioning measurements to the UE and the UE may determine its position based at least in part on the received positioning measurements, positioning measurements obtained by the UE, and/or the like. In this way, a UE may determine its own position using input from other devices that represent other perspectives.

In some aspects, the UE may transmit positioning measurements to another UE, which determines the UE's position. The other UE may report the determined position to the UE. In this way, computational burdens may be borne by other UEs such as, for example, RSUs. In some aspects, multiple other UEs may determine the position of the UE. In some aspects, the UE may transmit positioning measurements to the other UEs, and those other UEs may communicate with one another to exchange positioning measurements, share computational burdens, and/or the like. In this way, a sidelink-assisted positioning procedure may be made more accurate without increasing computational burden on the UE whose position is being determined.

Figure 5:
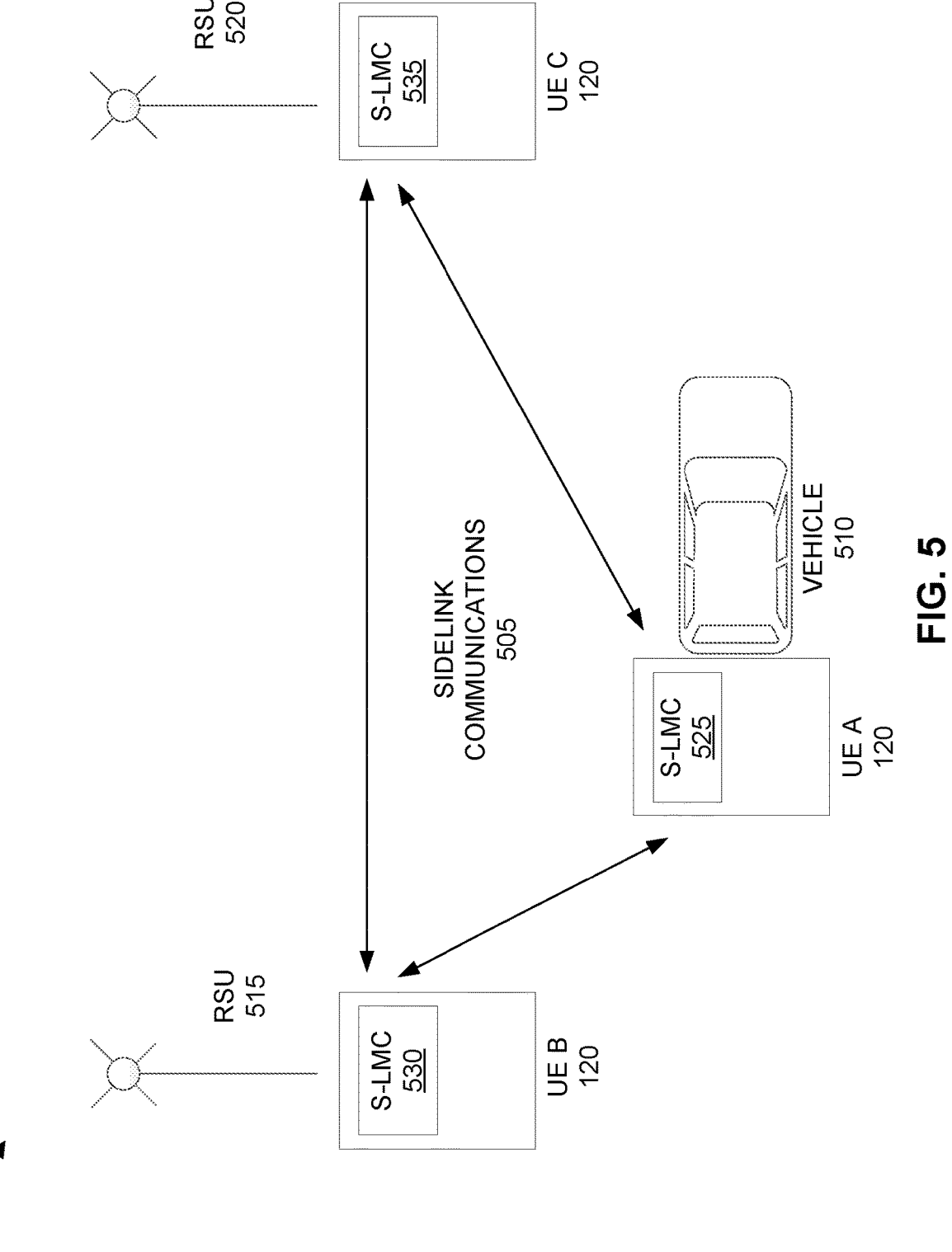
FIG. 5 is a diagram illustration an example of a sidelink-assisted positioning architecture, in accordance with the present disclosure.

FIG. 5 is a diagram illustrating an example 500 of a sidelink-assisted positioning architecture, in accordance with the present disclosure. As shown, a first UE 120 (shown as "UE A"), a second UE 120 (shown as "UE B"), and a third UE 120 (shown as "UE C") may communicate with one another via sidelink communications 505. In some aspects, the sidelink communications 505 may include PC5 signaling.

In some aspects, any one or more of the UE A 120, UE B 120, and UE C 120 may be associated with a pedestrian, a vehicle, a RSU, and/or the like. As shown in FIG. 5, in some aspects, the UE A 120 may be associated with a vehicle 510, the UE B 120 may be associated with a first RSU 515, and the UE C 120 may be associated with a second RSU 520.

As is further shown in FIG. 5, UE A 120 may include a first S-LMC 525, UE B 120 may include a second S-LMC 530, and UE C 120 may include a third S-LMC 535. The S-LMCs 525, 530, and 535 may be provided in a V2X protocol layer in the protocol stack associated with each UE 120. In some aspects, one or more of the S-LMCs 525, 530, and 535 may support one or more operations similar to operations that may be supported by an LMF. In some aspects, communications between UEs 120 described herein may refer to communications between respective S-LMCs of the UEs 120. In some aspects, one or more of the S-LMCs 525, 530, and 535 may support all of the operations typically supported by an LMF. In some aspects, for example, one or more of the S-LMCs 525, 530, and 535 may support a capability request operation, a capability response operation, an assistance data receipt operation, an assistance data provision operation, a measurement operation, a measurement receipt operation, a first location determination operation associated with the UE, a second location determination operation associated with the other UE, and/or the like.

Various aspects of the example 500 architecture depicted in FIG. 5 may be configured to support UE positioning scenarios that do not rely on a central entity such as an LMF and, instead, rely on sidelink communications, measurements, computations, and/or the like. Some aspects of the example 500 architecture shown in FIG. 5 may support aspects of the sidelink-assisted positioning methods shown in, and described below in connection with, FIGS. 6-10.

In some aspects, the UE A 120 may determine its position based at least in part on positioning measurements obtained by the UE A 120, the UE B 120, the UE C 120, and/or the like. In some aspects, the positioning measurements may include round trip time (RTT) measurements may be made by one or more of the UEs 120 based on PRS transmissions via the sidelink communications 505. The UE A 120 may receive positioning measurements from the UE B 120, the UE C 120, and/or the like. In some aspects, the UE A 120 may obtain positioning measurements associated with the UE A 120 based on PRS transmissions, vehicle sensors (e.g., wheel sensors, and/or the like), and/or the like. The UE A 120 may determine its position based at least in part on one or more of these positioning measurements.

In some aspects, the UE B 120 and/or the UE C 120 may determine the position of the UE A 120. The UE B 120 and/or the UE C 120 may determine the position of the UE A 120 based at least in part on positioning measurements obtained by the UE A 120, the UE B 120, the UE C 120, and/or the like. In some aspects, the positioning measurements may include RTT measurements made by one or more of the UEs 120 based on PRS transmissions via the sidelink communications 505. In some aspects, the UE A 120 may obtain positioning measurements associated with the UE A 120 based on vehicle sensors and may transmit those positioning measurements to the UE B 120 and/or the UE C 120. The UE B 120 and/or the UE C 120 may determine the position of the UE A 120 based at least in part on one or more of these positioning measurements. In some aspects, the UE B 120 and the UE C 120 may coordinate with one another to determine the position of the UE A 120.

Various aspects of the techniques and apparatuses described above may facilitate sidelink-assisted positioning. In some aspects, a UE's position may be determined using input from one or more other devices that represent various perspectives. In various aspects of the techniques described herein, any number of UEs may be involved in a sidelink-assisted positioning process.

In some aspects, the UE may transmit positioning measurements to another UE, which determines the UE's position. The other UE may report the determined position to the UE. In this way, computational burdens may be borne by other UEs such as, for example, RSUs. In some aspects, multiple other UEs may determine the position of the UE. In some aspects, the UE may transmit positioning measurements to the other UEs, and those other UEs may communicate with one another to exchange positioning measurements, share computational burdens, and/or the like. In this way, a sidelink-assisted positioning procedure may be made more accurate without increasing computational burden on the UE whose position is being determined.

As indicated above, FIG. 5 is provided as an example. Other examples may differ from what is described with respect to FIG. 5.

Figure 6:
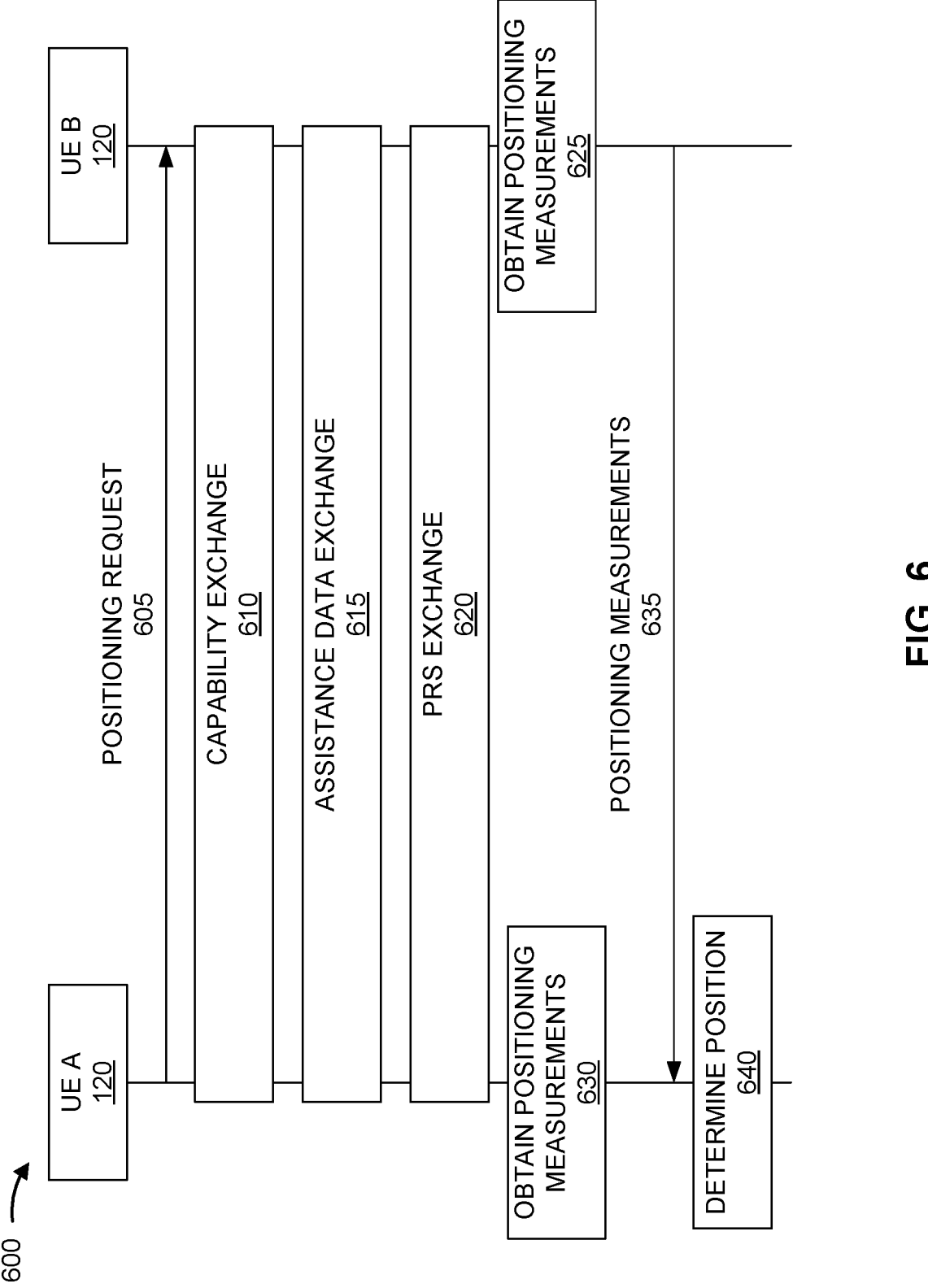
FIGS. 6-8 are diagrams illustrating examples of sidelink-assisted positioning, in accordance with the present disclosure.

FIG. 6 is a diagram illustrating an example 600 of sidelink-assisted positioning, in accordance with the present disclosure. As shown, a first UE 120 (shown as "UE A") and a second UE 120 (shown as "UE B") may communicate with one another via sidelink communications.

As shown by reference number 605, the UE A 120 may transmit, and the UE B 120 may receive, a positioning request. The positioning request may be associated with a procedure for determining a position of the UE A 120. In some aspects, the positioning request may include a sidelink communication between an S-LMC of the UE A 120 and an S-LMC of the UE B 120. In some aspects, sidelink communication may be performed using PC5 signaling messages.

As shown by reference number 610, the UE A 120 and the UE B 120 may engage in a capability exchange. In some aspects, the capability exchange may include the UE A 120 transmitting a capability request to the UE B 120, and the UE B 120 responding to the capability request by providing capability information associated with the UE B 120. Similarly, the capability exchange may include the UE B 120 transmitting a capability request to the UE A 120, and the UE A 120 responding by providing capability information associated with the UE A 120. In some aspects, capability information associated with a UE 120 may indicate an identification of the UE as an anchor UE (e.g., a UE that does not move, that is not moving, that will not move during a particular period of time, that moves slowly, and/or the like), one or more positioning measurements that the UE is capable of performing, a velocity sensor error, a calibration error, and/or the like.

As shown by reference number 615, the UE A 120 and the UE B 120 may engage in an assistance data exchange. In some aspects, the assistance data exchange may include the UE A 120 providing a first set of assistance data to the UE B 120. In some aspects, the assistance data exchange may include the UE B 120 providing a second set of assistance data to the UE A 120. In some aspects, the first set of assistance data may include a first set of PRS configuration information associated with the UE A 120, the UE B 120, and/or the like. In some aspects, the second set of assistance data may include a second set of PRS configuration information associated with the UE A 120, the UE B 120, and/or the like.

As shown by reference number 620, the UE A 120 and the UE B 120 may engage in a PRS exchange. In some aspects, the PRS exchange may include the UE B 120 transmitting a first PRS to the UE A 120. In some aspects, the first PRS may be based at least in part on the first set of assistance data. In some aspects, the PRS exchange may include the UE A 120 transmitting a second PRS to the UE B 120. In some aspects, the second PRS may be based at least in part on the second set of assistance data.

As shown by reference number 625, the UE B 120 may obtain positioning measurements associated with the UE A

120. In some aspects, the positioning measurements may be based at least in part on a PRS received from the UE A 120. In some aspects, the positioning measurements may include time difference of arrival (TDOA) measurements associated with the PRS, angle of arrival (AoA) measurements associated with the PRS, and/or the like.

As shown by reference number 630, the UE A 120 may obtain positioning measurements associated with the UE A 120. In some aspects, the positioning measurements may be based at least in part on a PRS received from the UE B 120. In some aspects, the positioning measurements may include TDOA measurements associated with the PRS, AoA measurements associated with the PRS, and/or the like. In some aspects, the UE A 120 may obtain a vehicle positioning measurement from a sensor associated with a vehicle corresponding to the UE A 120. In some aspects, the sensor may include a wheel sensor. In some aspects, the vehicle positioning measurement may include velocity information, acceleration information, and/or the like.

As shown by reference number 635, the UE B 120 may transmit, and the UE A 120 may receive, positioning measurements associated with the UE A 120 and obtained by the UE B 120. As shown by reference number 640, the UE A 120 may determine a position of the UE A 120. In some aspects, the UE A 120 may determine the position of the UE A 120 based at least in part on one or more of the positioning measurements obtained and/or received by the UE A 120. In some aspects, for example, the UE A 120 may compute the position of the UE A 120 based at least in part on a first positioning measurement obtained by the UE A 120, a second positioning measurement received from the UE B 120, and/or the like.

As indicated above, FIG. 6 is provided as an example. Other examples may differ from what is described with respect to FIG. 6.

Figure 7:
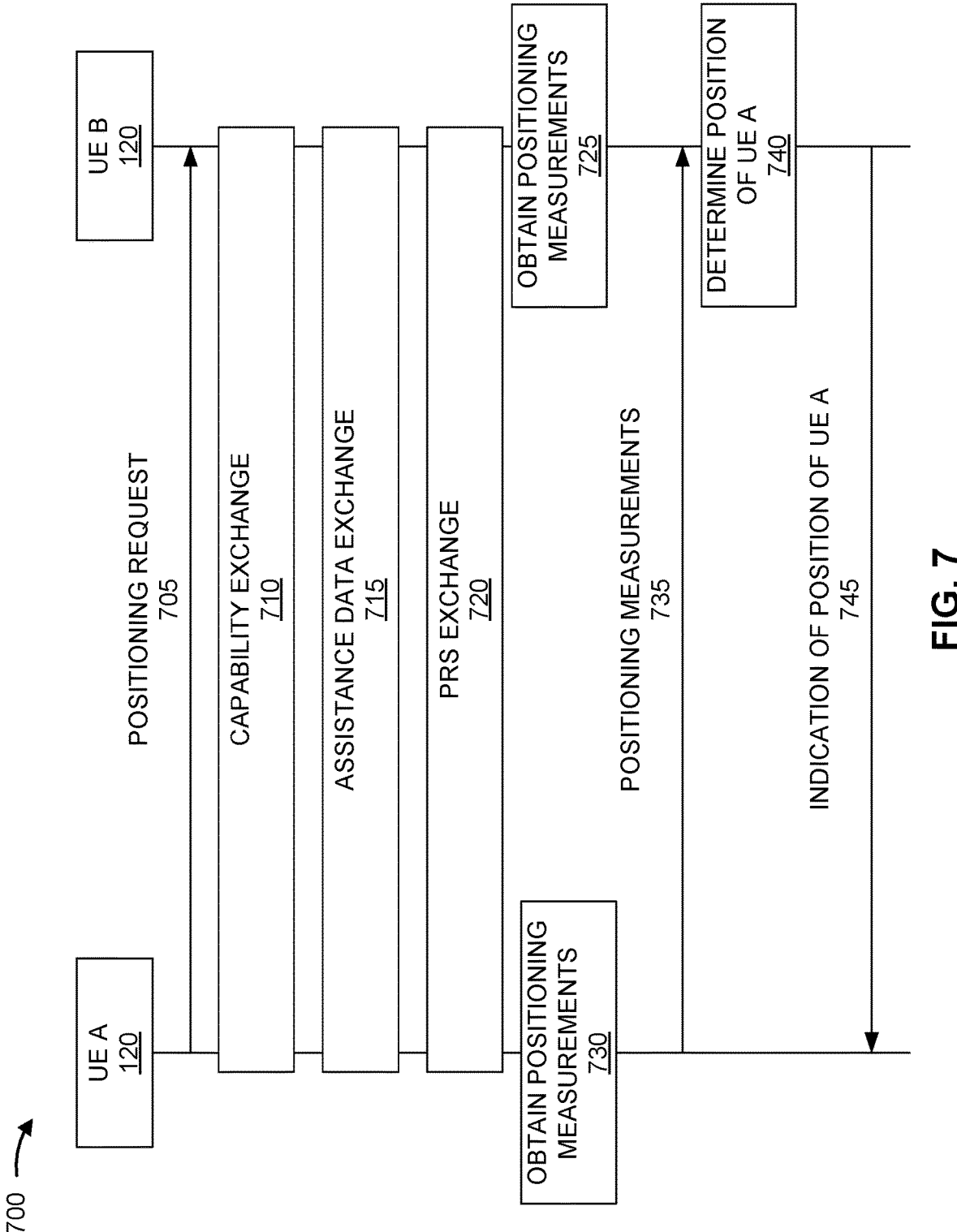

FIG. 7 is a diagram illustrating an example 700 of sidelink-assisted positioning, in accordance with the present disclosure. As shown, a first UE 120 (shown as "UE A") and a second UE 120 (shown as "UE B") may communicate with one another via sidelink communications.

As shown by reference number 705, the UE A 120 may transmit, and the UE B 120 may receive, a positioning request. The positioning request may be associated with a procedure for determining a position of the UE A 120. In some aspects, the positioning request may include a sidelink communication between an S-LMC of the UE A 120 and an S-LMC of the UE B 120. In some aspects, sidelink communication may be performed using PC5 signaling messages.

As shown by reference number 710, the UE A 120 and the UE B 120 may engage in a capability exchange. In some aspects, the capability exchange may include the UE A 120 transmitting a capability request to the UE B 120, and the UE B 120 responding to the capability request by providing capability information associated with the UE B 120. Similarly, the capability exchange may include the UE B 120 transmitting a capability request to the UE A 120, and the UE A 120 responding by providing capability information associated with the UE A 120. In some aspects, capability information associated with a UE 120 may indicate an identification of the UE as an anchor UE (e.g., a UE that does not move, that is not moving, that will not move during a particular period of time, that moves slowly, and/or the like), one or more positioning measurements that the UE is capable of performing, a velocity sensor error, a calibration error, and/or the like.

As shown by reference number 715, the UE A 120 and the UE B 120 may engage in an assistance data exchange. In some aspects, the assistance data exchange may include the UE A 120 providing a first set of assistance data to the UE B 120. In some aspects, the assistance data exchange may include the UE B 120 providing a second set of assistance data to the UE A 120. In some aspects, the first set of assistance data may include a first set of PRS configuration information associated with the UE A 120, the UE B 120, and/or the like. In some aspects, the second set of assistance data may include a second set of PRS configuration information associated with the UE A 120, the UE B 120, and/or the like.

As shown by reference number 720, the UE A 120 and the UE B 120 may engage in a PRS exchange. In some aspects, the PRS exchange may include the UE B 120 transmitting a first PRS to the UE A 120. In some aspects, the first PRS may be based at least in part on the first set of assistance data. In some aspects, the PRS exchange may include the UE A 120 transmitting a second PRS to the UE B 120. In some aspects, the second PRS may be based at least in part on the second set of assistance data.

As shown by reference number 725, the UE B 120 may obtain positioning measurements associated with the UE A 120. In some aspects, the positioning measurements may be based at least in part on a PRS received from the UE A 120. In some aspects, the positioning measurements may include TDOA measurements associated with the PRS, AoA measurements associated with the PRS, and/or the like.

As shown by reference number 730, the UE A 120 may obtain positioning measurements associated with the UE A 120. In some aspects, the positioning measurements may be based at least in part on a PRS received from the UE B 120. In some aspects, the positioning measurements may include TDOA measurements associated with the PRS, AoA measurements associated with the PRS, and/or the like. In some aspects, the UE A 120 may obtain a vehicle positioning measurement from a sensor associated with a vehicle corresponding to the UE A 120. In some aspects, the sensor may include a wheel sensor. In some aspects, the vehicle positioning measurement may include velocity information, acceleration information, and/or the like.

As shown by reference number 735, the UE A 120 may transmit, and the UE B 120 may receive, positioning measurements associated with the UE A 120 and obtained by the UE A 120, one or more errors associated with the positioning measurements, and/or the like. As shown by reference number 740, the UE B 120 may determine a position of the UE A 120. In some aspects, the UE B 120 may determine the position of the UE A 120 based at least in part on one or more of the positioning measurements obtained and/or received by the UE B 120. In some aspects, for example, the UE B 120 may compute the position of the UE A 120 based at least in part on a first positioning measurement obtained by the UE B 120, a second positioning measurement received from the UE A 120, and/or the like. As shown by reference number 745, the UE B 120 may transmit, and the UE A 120 may receive, an indication of the position of the UE A 120.

As indicated above, FIG. 7 is provided as an example. Other examples may differ from what is described with respect to FIG. 7.

Figure 8:
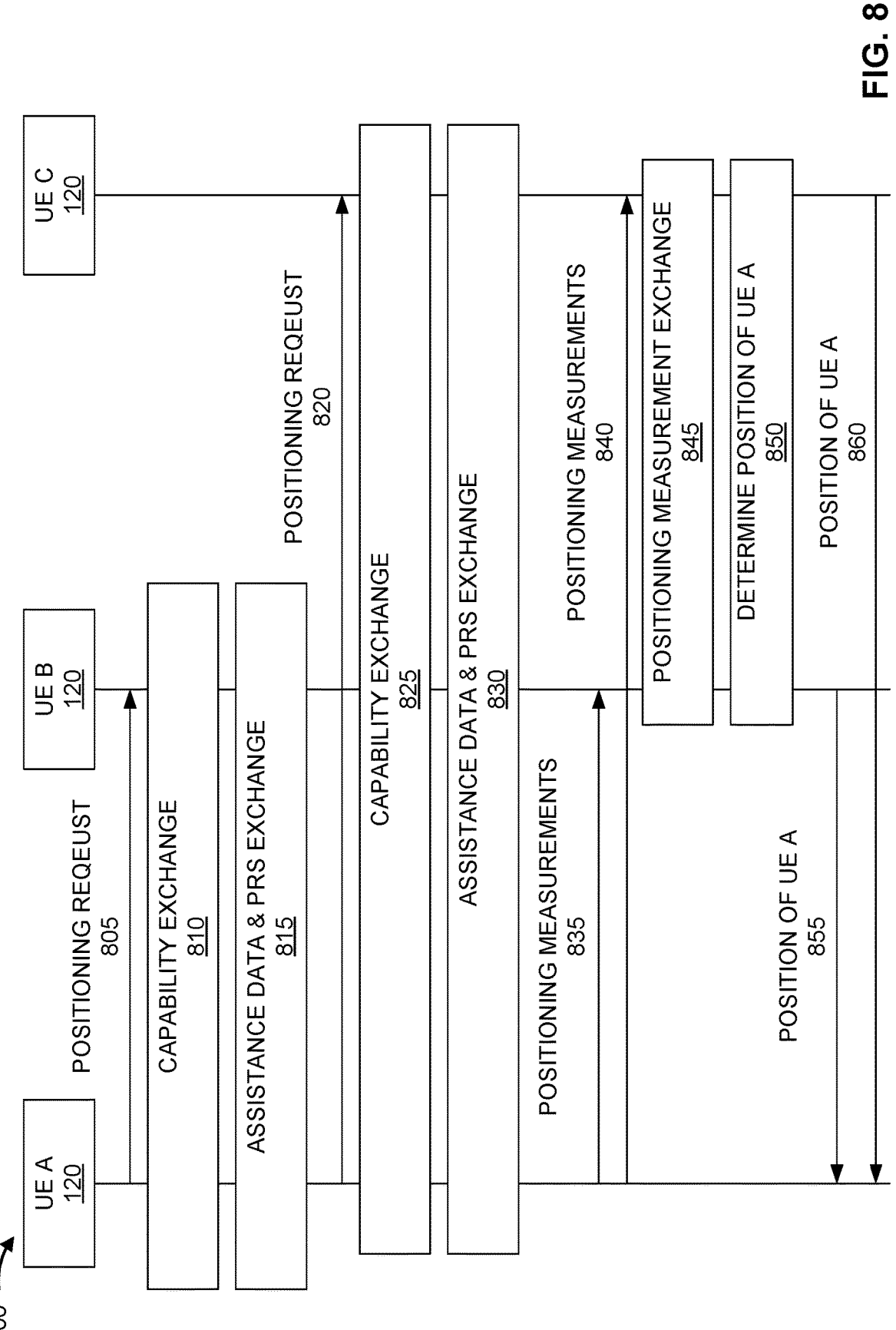

FIG. 8 is a diagram illustrating an example 800 of sidelink-assisted positioning, in accordance with the present disclosure. As shown, a first UE 120 (shown as "UE A"), a second UE 120 (shown as "UE B"), and a third UE 120 (shown as "UE C") may communicate with one another via sidelink communications.

As shown by reference number 805, the UE A 120 may transmit, and the UE B 120 may receive, a positioning request. The positioning request may be associated with a procedure for determining a position of the UE A 120. In some aspects, the positioning request may include a sidelink communication between an S-LMC of the UE A 120 and an S-LMC of the UE B 120. In some aspects, sidelink communication may be performed using PC5 signaling messages.

As shown by reference number 810, the UE A 120 and the UE B 120 may engage in a capability exchange. In some aspects, the capability exchange may include the UE A 120 transmitting a capability request to the UE B 120, and the UE B 120 responding to the capability request by providing capability information associated with the UE B 120. Similarly, the capability exchange may include the UE B 120 transmitting a capability request to the UE A 120, and the UE A 120 responding by providing capability information associated with the UE A 120. In some aspects, capability information associated with a UE 120 may indicate an identification of the UE as an anchor UE (e.g., a UE that does not move, that is not moving, that will not move during a particular period of time, that moves slowly, and/or the like), one or more positioning measurements that the UE is capable of performing, a velocity sensor error, a calibration error, and/or the like.

As shown by reference number 815, the UE A 120 and the UE B 120 may engage in an assistance data and PRS exchange. In some aspects, the assistance data and PRS exchange may include the UE A 120 providing a first set of assistance data to the UE B 120. In some aspects, the assistance data and PRS exchange may include the UE B 120 providing a second set of assistance data to the UE A 120. In some aspects, the first set of assistance data may include a first set of PRS configuration information associated with the UE A 120, the UE B 120, and/or the like. In some aspects, the second set of assistance data may include a second set of PRS configuration information associated with the UE A 120, the UE B 120, and/or the like.

In some aspects, the assistance data and PRS exchange may include the UE B 120 transmitting a first PRS to the UE A 120. In some aspects, the first PRS may be based at least in part on the first set of assistance data. In some aspects, the assistance data and PRS exchange may include the UE A 120 transmitting a second PRS to the UE B 120. In some aspects, the second PRS may be based at least in part on the second set of assistance data.

As shown by reference number 820, the UE A 120 may transmit, and the UE C 120 may receive, a positioning request. The positioning request may be associated with a procedure for determining a position of the UE A 120. In some aspects, the positioning request may include a sidelink communication between an S-LMC of the UE A 120 and an S-LMC of the UE C 120. In some aspects, sidelink communication may be performed using PC5 signaling messages.

As shown by reference number 825, the UE A 120 and the UE C 120 may engage in a capability exchange. In some aspects, the capability exchange may include the UE A 120 transmitting a capability request to the UE C 120, and the UE C 120 responding to the capability request by providing capability information associated with the UE C 120. Similarly, the capability exchange may include the UE C 120 transmitting a capability request to the UE A 120, and the UE A 120 responding by providing capability information associated with the UE A 120.

As shown by reference number 830, the UE A 120 and the UE C 120 may engage in an assistance data and PRS exchange. In some aspects, the assistance data and PRS exchange may include the UE A 120 providing a third set of assistance data to the UE C 120. In some aspects, the assistance data and PRS exchange may include the UE C 120 providing a fourth set of assistance data to the UE A 120. In some aspects, the third set of assistance data may include a third set of PRS configuration information associated with the UE A 120, the UE C 120, and/or the like. In some aspects, the fourth set of assistance data may include a fourth set of PRS configuration information associated with the UE A 120, the UE C 120, and/or the like.

In some aspects, the assistance data and PRS exchange may include the UE C 120 transmitting a third PRS to the UE A 120. In some aspects, the third PRS may be based at least in part on the third set of assistance data. In some aspects, the assistance data and PRS exchange may include the UE A 120 transmitting a fourth PRS to the UE C 120. In some aspects, the fourth PRS may be based at least in part on the fourth set of assistance data.

As shown by reference number 835, the UE A 120 may transmit, and the UE B 120 may receive, positioning measurements associated with the UE A 120 and obtained by the UE A 120, one or more errors associated with the positioning measurements, and/or the like. As shown by reference number 840, the UE A 120 may transmit, and the UE C 120 may receive, positioning measurements associated with the UE A 120 and obtained by the UE A 120, one or more errors associated with the positioning measurements, and/or the like. In some aspects, the positioning measurements obtained by the UE A 120 may include positioning measurements obtained based at least in part on a received PRS, vehicle positioning measurements obtained from a vehicle sensor, and/or the like.

In some aspects, the positioning measurements may be based at least in part on a PRS received from the UE B 120, a PRS received from the UE C 120, and/or the like. In some aspects, the positioning measurements may include TDOA measurements, AoA measurements, and/or the like. In some aspects, the UE A 120 may obtain a vehicle positioning measurement from a sensor associated with a vehicle corresponding to the UE A 120. In some aspects, the sensor may include a wheel sensor. In some aspects, the vehicle positioning measurement may include velocity information, acceleration information, and/or the like.

As shown by reference number 845, the UE B 120 and the UE C 120 may engage in a positioning measurement exchange. In some aspects, the positioning measurement exchange may include the UE B 120 transmitting, to the UE C 120, positioning measurements associated with the UE A 120, errors associated with the positioning measurements, partial information associated with the positioning measurements, and/or the like. In some aspects, the positioning measurement exchange may include the UE C 120 transmitting, to the UE B 120, positioning measurements associated with the UE A 120, errors associated with the positioning measurements, partial information associated with the positioning measurements, and/or the like. In some aspects, the positioning measurements may be based at least in part on one or more PRSs received by the UE B 120 (from the UE A 120, the UE C 120, and/or the like), one or more PRSs received by the UE C 120 (from the UE A 120, the UE B 120, and/or the like), and/or the like.

As shown by reference number 850, the UE B 120 and/or the UE C 120 may determine a position of the UE A 120. In some aspects, the UE B 120 and/or the UE C 120 may determine the position of the UE A 120 based at least in part on one or more of the positioning measurements obtained and/or received by the UE B 120 and/or the UE C 120. As shown by reference number 855, the UE B 120 may transmit, and the UE A 120 may receive, an indication of the position of the UE A 120. As shown by reference number 860, the UE C 120 may transmit, and the UE A 120 may receive, an indication of the position of the UE A 120.

In some aspects, the UE A 120 may determine the position of the UE A 120 by decoding one or more of the transmissions from UE B 120 and/or UE C 120. In some aspects, the position of the UE A 120 received from the UE B 120 may be different than the position of the UE A 120 received from the UE C 120. In some aspects, the UE A 120 may determine the position of the UE A 120 based at least in part on the positions received from the UE B 120 and the UE C 120. In some aspects, the UE A 120 may determine the position by taking into account errors indicated by the UE B 120 and/or the UE C 120, motion information associated with the UE B 120 and/or the UE C 120, and/or the like.

As indicated above, FIG. 8 is provided as an example. Other examples may differ from what is described with respect to FIG. 8.

FIG. 9 is a diagram illustrating an example process 900 performed, for example, by a UE, in accordance with the present disclosure. Example process 900 is an example where the UE (e.g., UE 120 and/or the like) performs operations associated with sidelink-assisted positioning.

As shown in FIG. 9, in some aspects, process 900 may include transmitting, via a transceiver to another UE, a positioning request associated with a procedure for determining a position of the UE, wherein the positioning request comprises a first sidelink communication between a first S-LMC of the UE and a second S-LMC of the other UE, wherein the first S-LMC and the second S-LMC comprise sub-functions associated with a vehicle-to-everything protocol layer (block 910). For example, the UE (e.g., using transmit processor 264, controller/processor 280, memory 282, and/or the like) may transmit, to another UE, a positioning request associated with a procedure for determining a position of the UE, as described above. In some aspects, the positioning request comprises a first sidelink communication between a first S-LMC of the UE and a second S-LMC of the other UE. In some aspects, the first S-LMC and the second S-LMC comprise sub-functions associated with a V2X protocol layer.

As further shown in FIG. 9, in some aspects, process 900 may include receiving, via the transceiver from the other UE, a second sidelink communication associated with the procedure for determining the position of the UE (block 920). For example, the UE (e.g., using receive processor 258, controller/processor 280, memory 282, and/or the like) may receive, from the other UE, a second sidelink communication associated with the procedure for determining the position of the UE, as described above.

As further shown in FIG. 9, in some aspects, process 900 may include determining the position of the UE based at least in part on the second sidelink communication (block 930). For example, the UE (e.g., using receive processor 258, controller/processor 280, memory 282, and/or the like) may determine the position of the UE based at least in part on the second sidelink communication, as described above.

Process 900 may include additional aspects, such as any single aspect or any combination of aspects described below and/or in connection with one or more other processes described elsewhere herein.

In a first aspect, each of the first S-LMC and the second S-LMC supports at least one of: a capability request operation, a capability response operation, an assistance data receipt operation, an assistance data provision operation, a measurement operation, a measurement receipt operation, a first location determination operation associated with the UE, a second location determination operation associated with the other UE, or a combination thereof.

In a second aspect, alone or in combination with the first aspect, the first sidelink communication and the second sidelink communication are performed using PC5 signaling messages.

In a third aspect, alone or in combination with one or more of the first and second aspects, the UE is associated with a vehicle.

In a fourth aspect, alone or in combination with one or more of the first through third aspects, the other UE is associated with a vehicle or an RSU.

In a fifth aspect, alone or in combination with one or more of the first through fourth aspects, process 900 includes receiving, via the transceiver, a capability request from the other UE.

In a sixth aspect, alone or in combination with one or more of the first through fifth aspects, process 900 includes providing, via the transceiver to the other UE, capability information associated with the UE.

In a seventh aspect, alone or in combination with the sixth aspect, the capability information associated with the UE indicates at least one of: one or more positioning measurements that the UE is capable of performing, a velocity sensor error, a calibration error, or a combination thereof.

In an eighth aspect, alone or in combination with one or more of the first through seventh aspects, process 900 includes receiving, via the transceiver from the other UE, capability information associated with the other UE.

In a ninth aspect, alone or in combination with the eighth aspect, the capability information associated with the other UE indicates at least one of: an identification of the other UE as an anchor UE, one or more positioning measurements that the other UE is capable of performing, a velocity sensor error, a calibration error, or a combination thereof.

In a tenth aspect, alone or in combination with one or more of the first through ninth aspects, process 900 includes providing, via the transceiver, a first set of assistance data to the other UE, receiving, via the transceiver, a second set of assistance data from the other UE, or a combination thereof.

In an eleventh aspect, alone or in combination with the tenth aspect, the first set of assistance data comprises a first set of PRS configuration information associated with at least one of the UE, the other UE, or a combination thereof, and the second set of assistance data comprises a second set of PRS configuration information associated with at least one of the UE, the other UE, or a combination thereof.

In a twelfth aspect, alone or in combination with one or more of the tenth through eleventh aspects, the second sidelink communication comprises an incoming PRS based at least in part on the first set of assistance data, and process 900 includes obtaining a positioning measurement based at least in part on the incoming PRS.

In a thirteenth aspect, alone or in combination with the twelfth aspect, process 900 includes transmitting, via the transceiver to the other UE, at least one of: the positioning measurement, an error associated with the positioning measurement, or a combination thereof.

In a fourteenth aspect, alone or in combination with one or more of the first through thirteenth aspects, process 900 includes transmitting, via the transceiver, an outgoing PRS based at least in part on the second set of assistance data, wherein the second sidelink communication comprises a positioning measurement based at least in part on the outgoing PRS.

In a fifteenth aspect, alone or in combination with one or more of the first through fourteenth aspects, determining the position of the UE comprises computing the position of the UE based at least in part on at least one of: a first positioning measurement obtained by the UE, a second positioning measurement received from the other UE, or a combination thereof.

In a sixteenth aspect, alone or in combination with one or more of the first through fifteenth aspects, process 900 includes receiving a vehicle positioning measurement from a sensor associated with a vehicle corresponding to the UE.

In a seventeenth aspect, alone or in combination with the sixteenth aspect, determining the position of the UE comprises computing the position of the UE based at least in part on the vehicle positioning measurement.

In an eighteenth aspect, alone or in combination with one or more of the sixteenth through seventeenth aspects, the sensor comprises a wheel sensor.

In a nineteenth aspect, alone or in combination with one or more of the sixteenth through eighteenth aspects, the vehicle positioning measurement comprises velocity information.

In a twentieth aspect, alone or in combination with one or more of the sixteenth through nineteenth aspects, process 900 includes transmitting, via the transceiver to the other UE, at least one of: the vehicle positioning measurement, an error associated with the vehicle positioning measurement, or a combination thereof.

In a twenty-first aspect, alone or in combination with one or more of the first through twentieth aspects, the second sidelink communication comprises an indication of the position of the UE and determining the position of the UE comprises decoding the second sidelink communication.

In a twenty-second aspect, alone or in combination with one or more of the first through twenty-first aspects, process 900 includes transmitting, via the transceiver, an additional positioning request to a third UE, wherein the additional positioning request comprises a third sidelink communication between the first S-LMC of the UE and a third S-LMC of the third UE.

In a twenty-third aspect, alone or in combination with the twenty-second aspect, process 900 includes receiving, via the transceiver, a first capability request from the other UE; receiving, via the transceiver, a second capability request from the third UE; providing, via the transceiver to the other UE, capability information associated with the UE; and providing, via the transceiver to the third UE, the capability information associated with the UE.

In a twenty-fourth aspect, alone or in combination with one or more of the twenty-second through twenty-third aspects, process 900 includes receiving, via the transceiver, a first set of assistance data from the other UE; and receiving a second set of assistance data from the third UE.

In a twenty-fifth aspect, alone or in combination with the twenty-fourth aspect, the first set of assistance data comprises PRS configuration information associated with at least one of the UE, the other UE, or a combination thereof, and the second set of assistance data comprises PRS configuration information associated with at least one of the UE, the third UE, or a combination thereof.

In a twenty-sixth aspect, alone or in combination with the twenty-fifth aspect, process 900 includes receiving, via the transceiver, a first PRS from the other UE; receiving, via the transceiver, a second PRS from the third UE; and obtaining at least one positioning measurement based at least in part on at least one of: the first PRS, the second PRS, or a combination thereof.

In a twenty-seventh aspect, alone or in combination with one or more of the twenty-fifth through twenty-sixth aspects, process 900 includes transmitting, via the transceiver, the at least one positioning measurement to at least one of the other UE, the third UE, or a combination thereof.

In a twenty-eighth aspect, alone or in combination with one or more of the twenty-fifth through twenty-sixth aspects, process 900 includes transmitting, via the transceiver, at least one of: a first outgoing PRS based at least in part on the first set of assistance data, a second outgoing PRS based at least in part on the second set of assistance data, or a combination thereof.

In a twenty-ninth aspect, alone or in combination with one or more of the twenty-second through twenty-eighth aspects, process 900 includes receiving, via the transceiver, a vehicle positioning measurement from a sensor associated with a vehicle corresponding to the UE; and transmitting, via the transceiver to at least one of the other UE, the third UE, or a combination thereof, at least one of: the vehicle positioning measurement, an error associated with the vehicle positioning measurement, or a combination thereof.

In a thirtieth aspect, alone or in combination with the twenty-ninth aspect, the sensor comprises a wheel sensor.

In a thirty-first aspect, alone or in combination with one or more of the twenty-ninth through thirtieth aspects, the vehicle positioning measurement comprises velocity information.

In a thirty-second aspect, alone or in combination with one or more of the twenty-second through thirty-first aspects, the second sidelink communication comprises an indication of the position of the UE, and determining the position of the UE comprises decoding the second sidelink communication.

In a thirty-third aspect, alone or in combination with one or more of the twenty-second through thirty-second aspects, the second sidelink communication comprises a first indication of the position of the UE, and process 900 includes receiving, via the transceiver, a third sidelink communication from the third UE, wherein the third sidelink communication comprises a second indication of the position of the UE, and wherein the UE determines the position of the UE based at least in part on the first indication of the position of the UE and the second indication of the position of the UE.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

FIG. 10 is a diagram illustrating an example process 1000 performed, for example, by a UE, in accordance with the present disclosure. Example process 1000 is an example where the UE (e.g., UE 120 and/or the like) performs operations associated with sidelink-assisted positioning.

As shown in FIG. 10, in some aspects, process 1000 may include receiving, via a transceiver from another UE, a positioning request associated with a procedure for determining a position of the other UE, wherein the positioning request comprises a first sidelink communication between a first S-LMC of the UE and a second S-LMC of the other UE, wherein the first S-LMC and the second S-LMC comprise sub-functions associated with a vehicle-to-everything protocol layer (block 1010). For example, the UE (e.g., using receive processor 258, controller/processor 280, memory 282, and/or the like) may receive, from another UE, a positioning request associated with a procedure for determining a position of the other UE, as described above. In some aspects, the positioning request comprises a first sidelink communication between a first S-LMC of the UE and a second S-LMC of the other UE. In some aspects, the first S-LMC and the second S-LMC comprise sub-functions associated with a V2X protocol layer.

As further shown in FIG. 10, in some aspects, process 1000 may include transmitting, via the transceiver to the other UE, a second sidelink communication associated with the procedure for determining the position of the other UE (block 1020). For example, the UE (e.g., using transmit processor 264, controller/processor 280, memory 282, and/or the like) may transmit, to the other UE, a second sidelink communication associated with the procedure for determining the position of the other UE, as described above.

Process 1000 may include additional aspects, such as any single aspect or any combination of aspects described below and/or in connection with one or more other processes described elsewhere herein.

In a first aspect, each of the first S-LMC and the second S-LMC supports at least one of: a capability request operation, a capability response operation, an assistance data receipt operation, an assistance data provision operation, a measurement operation, a measurement receipt operation, a first location determination operation associated with the UE, a second location determination operation associated with the other UE, or a combination thereof.

In a second aspect, alone or in combination with the first aspect, the first sidelink communication and the second sidelink communication are performed using PC5 signaling messages.

In a third aspect, alone or in combination with one or more of the first and second aspects, the UE is associated with a vehicle or an RSU.

In a fourth aspect, alone or in combination with one or more of the first through third aspects, the other UE is associated with a vehicle.

In a fifth aspect, alone or in combination with one or more of the first through fourth aspects, process 1000 includes transmitting, via the transceiver, a capability request to the other UE.

In a sixth aspect, alone or in combination with one or more of the first through fifth aspects, process 1000 includes receiving, via the transceiver from the other UE, capability information associated with the other UE.

In a seventh aspect, alone or in combination with the sixth aspect, the capability information associated with the other UE indicates at least one of: one or more positioning measurements that the other UE is capable of performing, a velocity sensor error, a calibration error, or a combination thereof.

In an eighth aspect, alone or in combination with one or more of the first through seventh aspects, process 1000 includes transmitting, via the transceiver to the other UE, capability information associated with the UE.

In a ninth aspect, alone or in combination with the eighth aspect, the capability information associated with the UE indicates at least one of: an identification of the UE as an anchor UE, one or more positioning measurements that the UE is capable of performing, a velocity sensor error, a calibration error, or a combination thereof.

In a tenth aspect, alone or in combination with one or more of the first through ninth aspects, process 1000 includes at least one of: receiving, via the transceiver, a first set of assistance data from the other UE, providing, via the transceiver, a second set of assistance data to the other UE, or a combination thereof.

In an eleventh aspect, alone or in combination with the tenth aspect, the first set of assistance data comprises a first set of PRS configuration information associated with at least one of the UE, the other UE, or a combination thereof, and the second set of assistance data comprises a second set of PRS configuration information associated with at least one of the UE, the other UE, or a combination thereof.

In a twelfth aspect, alone or in combination with the tenth aspect, the second sidelink communication comprises an outgoing PRS based at least in part on the first set of assistance data.

In a thirteenth aspect, alone or in combination with the twelfth aspect, process 1000 includes receiving, via the transceiver from the other UE, at least one of: a positioning measurement based at least in part on the outgoing PRS, an error associated with the positioning measurement, or a combination thereof.

In a fourteenth aspect, alone or in combination with the tenth aspect, process 1000 includes receiving, via the transceiver, an incoming PRS based at least in part on the second set of assistance data, wherein the second sidelink communication comprises a positioning measurement based at least in part on the incoming PRS.

In a fifteenth aspect, alone or in combination with one or more of the tenth through fourteenth aspects, process 1000 includes receiving, via the transceiver from the other UE, at least one of: a vehicle positioning measurement, an error associated with the vehicle positioning measurement, or a combination thereof.

In a sixteenth aspect, alone or in combination with the fifteenth aspect, the vehicle positioning measurement comprises velocity information.

In a seventeenth aspect, alone or in combination with one or more of the first through sixteenth aspects, process 1000 includes determining a position of the UE, wherein the second sidelink communication comprises an indication of the position of the UE.

In an eighteenth aspect, alone or in combination with the seventeenth aspect, the position of the UE is determined based at least in part on positioning information received from a third UE.

In a nineteenth aspect, alone or in combination with one or more of the seventeenth through eighteenth aspects, process 1000 includes transmitting, via the transceiver to a third UE, a positioning measurement associated with the other UE.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

The following provides an overview of some Aspects of the present disclosure:

Aspect 1: A method of wireless communication performed by a user equipment (UE), comprising: transmitting, via a transceiver to another UE, a positioning request associated with a procedure for determining a position of the UE, wherein the positioning request comprises a first side-link communication between a first sidelink location management component (S-LMC) of the UE and a second S-LMC of the other UE, wherein the first S-LMC and the second S-LMC comprise sub-functions associated with a vehicle-to-everything protocol layer; receiving, via the transceiver from the other UE, a second sidelink communication associated with the procedure for determining the position of the UE; and determining the position of the UE based at least in part on the second sidelink communication.

Aspect 2: The method of Aspect 1, wherein each of the first S-LMC and the second S-LMC supports at least one of: a capability request operation, a capability response operation, an assistance data receipt operation, an assistance data provision operation, a measurement operation, a measurement receipt operation, a first location determination operation associated with the UE, a second location determination operation associated with the other UE, or a combination thereof.

Aspect 3: The method of either of Aspects 1 or 2, wherein the first sidelink communication and the second sidelink communication are performed using PC5 signaling messages.

Aspect 4: The method of any of Aspects 1-3, wherein the UE is associated with a vehicle.

Aspect 5: The method of any of Aspects 1-4, wherein the other UE is associated with a vehicle or a roadside unit.

Aspect 6: The method of any of Aspects 1-5, further comprising receiving, via the transceiver, a capability request from the other UE.

Aspect 7: The method of any of Aspects 1-6, further comprising providing, via the transceiver to the other UE, capability information associated with the UE.

Aspect 8: The method of Aspect 7, wherein the capability information associated with the UE indicates at least one of: one or more positioning measurements that the UE is capable of performing, a velocity sensor error, a calibration error, or a combination thereof.

Aspect 9: The method of any of Aspects 1-8, further comprising receiving, via the transceiver from the other UE, capability information associated with the other UE.

Aspect 10: The method of Aspect 9, wherein the capability information associated with the other UE indicates at least one of: an identification of the other UE as an anchor UE, one or more positioning measurements that the other UE is capable of performing, a velocity sensor error, a calibration error, or a combination thereof.

Aspect 11: The method of any of Aspects 1-10, further comprising at least one of: providing, via the transceiver, a first set of assistance data to the other UE, receiving, via the transceiver, a second set of assistance data from the other UE, or a combination thereof.

Aspect 12: The method of Aspect 11, wherein the first set of assistance data comprises a first set of positioning reference signal (PRS) configuration information associated with at least one of the UE, the other UE, or a combination thereof, and wherein the second set of assistance data comprises a second set of PRS configuration information associated with at least one of the UE, the other UE, or a combination thereof.

Aspect 13: The method either of Aspects 11 or 12, wherein the second sidelink communication comprises an incoming PRS based at least in part on the first set of assistance data, and wherein the method further comprises obtaining a positioning measurement based at least in part on the incoming PRS.

Aspect 14: The method of Aspect 13, further comprising transmitting, via the transceiver to the other UE, at least one of: the positioning measurement, an error associated with the positioning measurement, or a combination thereof.

Aspect 15: The method any of Aspects 1-14, further comprising: transmitting, via the transceiver, an outgoing PRS based at least in part on the second set of assistance data, wherein the second sidelink communication comprises a positioning measurement based at least in part on the outgoing PRS.

Aspect 16: The method of any of Aspects 1-15, wherein determining the position of the UE comprises computing the position of the UE based at least in part on at least one of: a first positioning measurement obtained by the UE, a second positioning measurement received from the other UE, or a combination thereof.

Aspect 17: The method of any of Aspects 1-16, further comprising receiving a vehicle positioning measurement from a sensor associated with a vehicle corresponding to the UE.

Aspect 18: The method of Aspect 17, wherein determining the position of the UE comprises computing the position of the UE based at least in part on the vehicle positioning measurement.

Aspect 19: The method of either of Aspects 17 or 18, wherein the sensor comprises a wheel sensor.

Aspect 20: The method of any of Aspects 17-19, wherein the vehicle positioning measurement comprises velocity information.

Aspect 21: The method of any of Aspects 17-20, further comprising transmitting, via the transceiver to the other UE, at least one of: the vehicle positioning measurement, an error associated with the vehicle positioning measurement, or a combination thereof.

Aspect 22: The method of any of Aspects 1-21, wherein the second sidelink communication comprises an indication of the position of the UE, and wherein determining the position of the UE comprises decoding the second sidelink communication.

Aspect 23: The method of any of Aspects 1-22, further comprising: transmitting, via the transceiver, an additional positioning request to a third UE, wherein the additional positioning request comprises a third sidelink communication between the first S-LMC of the UE and a third S-LMC of the third UE.

Aspect 24: The method of Aspect 23, further comprising: receiving, via the transceiver, a first capability request from the other UE; receiving, via the transceiver, a second capability request from the third UE; providing, via the transceiver to the other UE, capability information associated with the UE; and providing, via the transceiver to the third UE, the capability information associated with the UE.

Aspect 25: The method of either of Aspects 23 or 24, further comprising: receiving, via the transceiver, a first set of assistance data from the other UE; and receiving, via the transceiver, a second set of assistance data from the third UE.

Aspect 26: The method of Aspect 25, wherein the first set of assistance data comprises positioning reference signal (PRS) configuration information associated with at least one of the UE, the other UE, or a combination thereof, and wherein the second set of assistance data comprises PRS configuration information associated with at least one of the UE, the third UE, or a combination thereof.

Aspect 27: The method of Aspect 26, further comprising: receiving, via the transceiver, a first PRS from the other UE; receiving, via the transceiver, a second PRS from the third UE; and obtaining at least one positioning measurement based at least in part on at least one of: the first PRS, the second PRS, or a combination thereof.

Aspect 28: The method of either of Aspects 26 or 27, further comprising transmitting, via the transceiver, the at least one positioning measurement to at least one of the other UE, the third UE, or a combination thereof.

Aspect 29: The method of either of Aspects 26 or 27, further comprising transmitting, via the transceiver, at least one of: a first outgoing PRS based at least in part on the first set of assistance data, a second outgoing PRS based at least in part on the second set of assistance data, or a combination thereof.

Aspect 30: The method of any of Aspects 23-29, further comprising: receiving a vehicle positioning measurement from a sensor associated with a vehicle corresponding to the UE; and transmitting, via the transceiver to at least one of the other UE, the third UE, or a combination thereof, at least one of: the vehicle positioning measurement, an error associated with the vehicle positioning measurement, or a combination thereof.

Aspect 31: The method of Aspect 30, wherein the sensor comprises a wheel sensor.

Aspect 32: The method of either of Aspects 30 or 31, wherein the vehicle positioning measurement comprises velocity information.

Aspect 33: The method of any of Aspects 23-32, wherein the second sidelink communication comprises an indication of the position of the UE, and wherein determining the position of the UE comprises decoding the second sidelink communication.

Aspect 34: The method of any of Aspects 23-33, wherein the second sidelink communication comprises a first indication of the position of the UE, and the method further comprises receiving, via the transceiver, a third sidelink communication from the third UE, wherein the third sidelink communication comprises a second indication of the position of the UE, wherein the UE determines the position of the UE based at least in part on the first indication of the position of the UE and the second indication of the position of the UE.

Aspect 35: A method of wireless communication performed by a user equipment (UE), comprising: receiving, via a transceiver from another UE, a positioning request associated with a procedure for determining a position of the other UE, wherein the positioning request comprises a first sidelink communication between a first sidelink location management component (S-LMC) of the UE and a second S-LMC of the other UE, wherein the first S-LMC and the second S-LMC comprise sub-functions associated with a vehicle-to-everything protocol layer; and transmitting, via the transceiver to the other UE, a second sidelink communication associated with the procedure for determining the position of the other UE.

Aspect 36: The method of Aspect 35, wherein each of the first S-LMC and the second S-LMC supports at least one of: a capability request operation, a capability response operation, an assistance data receipt operation, an assistance data provision operation, a measurement operation, a measurement receipt operation, a first location determination operation associated with the UE, a second location determination operation associated with the other UE, or a combination thereof.

Aspect 37: The method of either of Aspects 35 or 36, wherein the first sidelink communication and the second sidelink communication are performed using PC5 signaling messages.

Aspect 38: The method of any of Aspects 35-37, wherein the UE is associated with a vehicle or a roadside unit.

Aspect 39: The method of any of Aspects 35-38, wherein the other UE is associated with a vehicle.

Aspect 40: The method of any of Aspects 35-39, further comprising transmitting, via the transceiver, a capability request to the other UE.

Aspect 41: The method of any of Aspects 35-40, further comprising receiving, via the transceiver from the other UE, capability information associated with the other UE.

Aspect 42: The method of Aspect 41, wherein the capability information associated with the other UE indicates at least one of: one or more positioning measurements that the other UE is capable of performing, a velocity sensor error, a calibration error, or a combination thereof.

Aspect 43: The method of any of Aspects 35-42, further comprising transmitting, via the transceiver to the other UE, capability information associated with the UE.

Aspect 44: The method of Aspect 43, wherein the capability information associated with the UE indicates at least one of: an identification of the UE as an anchor UE, one or more positioning measurements that the UE is capable of performing, a velocity sensor error, a calibration error, or a combination thereof.

Aspect 45: The method of any of Aspects 35-44, further comprising at least one of: receiving, via the transceiver, a first set of assistance data from the other UE, providing, via the transceiver, a second set of assistance data to the other UE, or a combination thereof.

Aspect 46: The method of Aspect 45, wherein the first set of assistance data comprises a first set of positioning reference signal (PRS) configuration information associated with at least one of the UE, the other UE, or a combination thereof, and wherein the second set of assistance data comprises a second set of PRS configuration information associated with at least one of the UE, the other UE, or a combination thereof.

Aspect 47: The method of Aspect either of Aspects 45, wherein the second sidelink communication comprises an outgoing PRS based at least in part on the first set of assistance data.

Aspect 48: The method of Aspect 47, further comprising receiving, via the transceiver from the other UE, at least one of: a positioning measurement based at least in part on the outgoing PRS, an error associated with the positioning measurement, or a combination thereof.

Aspect 49: The method of Aspect 45, further comprising: receiving, via the transceiver, an incoming PRS based at least in part on the second set of assistance data, wherein the second sidelink communication comprises a positioning measurement based at least in part on the incoming PRS.

Aspect 50: The method of any of Aspects 45-70, further comprising receiving, via the transceiver from the other UE, at least one of: a vehicle positioning measurement, an error associated with the vehicle positioning measurement, or a combination thereof.

Aspect 51: The method of Aspect 50, wherein the vehicle positioning measurement comprises velocity information.

Aspect 52: The method of any of Aspects 35-51, further comprising determining a position of the UE, wherein the second sidelink communication comprises an indication of the position of the UE.

Aspect 53: The method of Aspect 52, wherein the position of the UE is determined based at least in part on positioning information received from a third UE.

Aspect 54: The method of either of Aspects 52 or 53, further comprising transmitting, via the transceiver to a third UE, a positioning measurement associated with the other UE.

Aspect 55: An apparatus for wireless communication at a device, comprising a processor; memory coupled with the processor; and instructions stored in the memory and executable by the processor to cause the apparatus to perform the method of one or more Aspects of Aspects 1-34.

Aspect 56: A device for wireless communication, comprising a memory and one or more processors coupled to the memory, the memory and the one or more processors configured to perform the method of one or more Aspects of Aspects 1-34.

Aspect 57: An apparatus for wireless communication, comprising at least one means for performing the method of one or more Aspects of Aspects 1-34.

Aspect 58: A non-transitory computer-readable medium storing code for wireless communication, the code comprising instructions executable by a processor to perform the method of one or more Aspects of Aspects 1-34.

Aspect 59: A non-transitory computer-readable medium storing a set of instructions for wireless communication, the set of instructions comprising one or more instructions that, when executed by one or more processors of a device, cause the device to perform the method of one or more Aspects of Aspects 1-34.

Aspect 60: An apparatus for wireless communication at a device, comprising a processor; memory coupled with the processor; and instructions stored in the memory and executable by the processor to cause the apparatus to perform the method of one or more Aspects of Aspects 35-54.

Aspect 61: A device for wireless communication, comprising a memory and one or more processors coupled to the memory, the memory and the one or more processors configured to perform the method of one or more Aspects of Aspects 35-54.

Aspect 62: An apparatus for wireless communication, comprising at least one means for performing the method of one or more Aspects of Aspects 35-54.

Aspect 63: A non-transitory computer-readable medium storing code for wireless communication, the code comprising instructions executable by a processor to perform the method of one or more Aspects of Aspects 35-54.

Aspect 64: A non-transitory computer-readable medium storing a set of instructions for wireless communication, the set of instructions comprising one or more instructions that, when executed by one or more processors of a device, cause the device to perform the method of one or more Aspects of Aspects 35-54.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
  one or more memories;
  a transceiver; and
  one or more processors coupled to the one or more memories and the transceiver, the one or more processors configured to:
    transmit, via the transceiver to another UE, a positioning request associated with a procedure for determining a position of the UE, wherein:
      the positioning request comprises a first sidelink communication between a first sidelink location management component (S-LMC) of the UE and a second S-LMC of the other UE;
      the first S-LMC and the second S-LMC comprise sub-functions associated with a vehicle-to-everything protocol layer; and
      each of the first S-LMC and the second S-LMC supports:
        a capability request operation associated with the procedure for determining the position of the UE, and
        a capability response operation associated with the procedure for determining the position of the UE;
    receive, via the transceiver from the other UE, a second sidelink communication associated with the procedure for determining the position of the UE; and
    determine the position of the UE based at least in part on the second sidelink communication.

2. The UE of claim 1,
wherein each of the first S-LMC and the second S-LMC supports at least one of:
  an assistance data receipt operation,
  an assistance data provision operation,
  a first location determination operation associated with the UE,
  a second location determination operation associated with the other UE
  a measurement operation,
  a measurement receipt operation, or
  any combination thereof.

3. The UE of claim 1,
wherein the first sidelink communication and the second sidelink communication are performed using PC5 signaling messages.

4. The UE of claim 1,
wherein the UE is associated with a vehicle and wherein the other UE is associated with a vehicle or a roadside unit.

5. The UE of claim 1,
wherein the one or more processors are further configured to receive, via the transceiver, a capability request from the other UE.

6. The UE of claim 1,
wherein the one or more processors are further configured to transmit, via the transceiver to the other UE, capability information associated with the UE, wherein the capability information associated with the UE indicates at least one of:
  one or more positioning measurements that the UE is capable of performing,
  a velocity sensor error,
  a calibration error, or
  a combination thereof.

7. The UE of claim 1,
wherein the one or more processors are further configured to receive, via the transceiver from the other UE, capability information associated with the other UE, wherein the capability information associated with the other UE indicates at least one of:
  an identification of the other UE as an anchor UE,
  one or more positioning measurements that the other UE is capable of performing,
  a velocity sensor error,
  a calibration error, or
  any combination thereof.

8. The UE of claim 1,
wherein the one or more processors are further configured
to at least one of:
    transmit, via the transceiver, a first set of assistance data
to the other UE, wherein the first set of assistance
data comprises a first set of positioning reference
signal (PRS) configuration information associated
with at least one of the UE, the other UE, or a
combination thereof,
    receive, via the transceiver, a second set of assistance
data from the other UE, wherein the second set of
assistance data comprises a second set of PRS con-
figuration information associated with at least one of
the UE, the other UE, or a combination thereof, or
both.

9. The UE of claim 8,
wherein the second sidelink communication comprises an
incoming PRS based at least in part on the first set of
assistance data, and
    wherein the one or more processors are further config-
ured to obtain a positioning measurement based at
least in part on the incoming PRS.

10. The UE of claim 9,
wherein the one or more processors are further configured
to transmit, via the transceiver to the other UE, at least
one of:
    the positioning measurement,
    an error associated with the positioning measurement,
or
    a combination thereof.

11. The UE of claim 8,
wherein the one or more processors are further configured
to:
    transmit, via the transceiver, an outgoing PRS based at
least in part on the second set of assistance data,
        wherein the second sidelink communication com-
prises a positioning measurement based at least in
part on the outgoing PRS.

12. The UE of claim 1,
wherein the one or more processors, when determining
the position of the UE, are configured to compute the
position of the UE based at least in part on at least one
of:
    a first positioning measurement obtained by the UE,
    a second positioning measurement received from the
other UE, or
    a combination thereof.

13. The UE of claim 1,
wherein the one or more processors are further configured
to receive a vehicle positioning measurement from a
sensor associated with a vehicle corresponding to the
UE, and wherein the one or more processors, when
determining the position of the UE, are further config-
ured to compute the position of the UE based at least in
part on the vehicle positioning measurement.

14. The UE of claim 13,
wherein the sensor comprises a wheel sensor.

15. The UE of claim 13,
wherein the vehicle positioning measurement comprises
velocity information.

16. The UE of claim 13,
wherein the one or more processors are further configured
to transmit, via the transceiver to the other UE, at least
one of:
    the vehicle positioning measurement,
    an error associated with the vehicle positioning mea-
surement, or
    both.

17. The UE of claim 1,
wherein the second sidelink communication comprises an
indication of the position of the UE, and
    wherein the one or more processors, when determining
the position of the UE, are configured to decode the
second sidelink communication.

18. The UE of claim 1,
wherein the one or more processors are further configured
to:
    transmit, via the transceiver, an additional positioning
request to a third UE, wherein the additional posi-
tioning request comprises a third sidelink commu-
nication between the first S-LMC of the UE and a
third S-LMC of the third UE.

19. The UE of claim 18,
wherein the one or more processors are further configured
to:
    receive, via the transceiver, a first capability request
from the other UE;
    receive, via the transceiver, a second capability request
from the third UE;
    transmit, via the transceiver to the other UE, capability
information associated with the UE; and
    transmit, via the transceiver to the third UE, the capa-
bility information associated with the UE.

20. The UE of claim 18,
wherein the one or more processors are further configured
to:
    receive, via the transceiver, a first set of assistance data
from the other UE, wherein the first set of assistance
data comprises positioning reference signal (PRS)
configuration information associated with at least
one of the UE, the other UE, or a combination
thereof; and
    receive, via the transceiver, a second set of assistance
data from the third UE, wherein the second set of
assistance data comprises PRS configuration infor-
mation associated with at least one of the UE, the
third UE, or a combination thereof.

21. The UE of claim 20,
wherein the one or more processors are further configured
to:
    receive, via the transceiver, a first PRS from the other
UE;
    receive, via the transceiver, a second PRS from the
third UE; and
    obtain at least one positioning measurement based at
least in part on at least one of:
        the first PRS,
        the second PRS, or
        a combination thereof.

22. The UE of claim 21,
wherein the one or more processors are further configured
to transmit, via the transceiver, the at least one posi-
tioning measurement to at least one of the other UE, the
third UE, or a combination thereof.

23. The UE of claim 20,
wherein the one or more processors are further configured
to transmit, via the transceiver, at least one of:
    a first outgoing PRS based at least in part on the first set
of assistance data,
    a second outgoing PRS based at least in part on the
second set of assistance data, or
    a combination thereof.

24. The UE of claim 18,
wherein the one or more processors are further configured to:
  receive a vehicle positioning measurement from a sensor associated with a vehicle corresponding to the UE; and
  transmit, via the transceiver to at least one of the other UE, the third UE, or a combination thereof, at least one of:
    the vehicle positioning measurement,
    an error associated with the vehicle positioning measurement, or
    a combination thereof.

25. The UE of claim 24,
wherein the sensor comprises a wheel sensor, and wherein the vehicle positioning measurement comprises velocity information.

26. The UE of claim 18,
wherein the second sidelink communication comprises an indication of the position of the UE, and
  wherein the one or more processors, when determining the position of the UE, are configured to decode the second sidelink communication.

27. The UE of claim 18,
wherein the second sidelink communication comprises a first indication of the position of the UE, and
  wherein the one or more processors are further configured to receive, via the transceiver, a third sidelink communication from the third UE, wherein the third sidelink communication comprises a second indication of the position of the UE,
    wherein the UE determines the position of the UE based at least in part on the first indication of the position of the UE and the second indication of the position of the UE.

28. A user equipment (UE) for wireless communication, comprising:
  one or more memories;
  a transceiver; and
  one or more processors coupled to the one or more memories and the transceiver, the one or more processors configured to:
    receive, via the transceiver from another UE, a positioning request associated with a procedure for determining a position of the other UE, wherein:
      the positioning request comprises a first sidelink communication between a first sidelink location management component (S-LMC) of the UE and a second S-LMC of the other UE;
      the first S-LMC and the second S-LMC comprise sub-functions associated with a vehicle-to-everything protocol layer; and
      each of the first S-LMC and the second S-LMC supports:
        a capability request operation associated with the procedure for determining the position of the UE, and a capability response operation associated with the procedure for determining the position of the UE; and
    transmit, via the transceiver to the other UE, a second sidelink communication associated with the procedure for determining the position of the other UE.

29. A method of wireless communication performed by a user equipment (UE), comprising:
  transmitting, via a transceiver to another UE, a positioning request associated with a procedure for determining a position of the UE, wherein:
    the positioning request comprises a first sidelink communication between a first sidelink location management component (S-LMC) of the UE and a second S-LMC of the other UE;
    the first S-LMC and the second S-LMC comprise sub-functions associated with a vehicle-to-everything protocol layer; and
    each of the first S-LMC and the second S-LMC supports:
      a capability request operation associated with the procedure for determining the position of the UE, and
      a capability response operation associated with the procedure for determining the position of the UE;
  receiving, via the transceiver from the other UE, a second sidelink communication associated with the procedure for determining the position of the UE; and
  determining the position of the UE based at least in part on the second sidelink communication.

30. A method of wireless communication performed by a user equipment (UE), comprising:
  receiving, via a transceiver from another UE, a positioning request associated with a procedure for determining a position of the other UE, wherein:
    the positioning request comprises a first sidelink communication between a first sidelink location management component (S-LMC) of the UE and a second S-LMC of the other UE;
    the first S-LMC and the second S-LMC comprise sub-functions associated with a vehicle-to-everything protocol layer; and
    each of the first S-LMC and the second S-LMC supports:
      a capability request operation associated with the procedure for determining the position of the UE, and
      a capability response operation associated with the procedure for determining the position of the UE; and
  transmitting, via the transceiver to the other UE, a second sidelink communication associated with the procedure for determining the position of the other UE.

* * * * *